US008073398B2

(12) United States Patent
Steer

(10) Patent No.: US 8,073,398 B2
(45) Date of Patent: Dec. 6, 2011

(54) METHOD AND APPARATUS FOR ADAPTIVE CHANNEL UTILISATION

(75) Inventor: David Steer, Nepean (CA)

(73) Assignee: Nortel Networks Limited, Mississauga, Ontario (CA)

( * ) Notice: Subject to any disclaimer, the term of this patent is extended or adjusted under 35 U.S.C. 154(b) by 647 days.

(21) Appl. No.: 11/727,277

(22) Filed: Mar. 26, 2007

(65) Prior Publication Data
US 2008/0171520 A1 Jul. 17, 2008

Related U.S. Application Data

(60) Provisional application No. 60/785,482, filed on Mar. 24, 2006.

(51) Int. Cl.
*H04B 1/40* (2006.01)

(52) U.S. Cl. ............................. 455/77; 455/240; 455/78

(58) Field of Classification Search ................. 455/11.1, 455/73, 266, 339, 340; 375/259, 312, 344
See application file for complete search history.

(56) References Cited

U.S. PATENT DOCUMENTS 6,023,609 A * 2/2000 Futamura ........................ 455/82
6,639,911 B1 * 10/2003 Bingham ....................... 370/352
2001/0006509 A1 7/2001 Nguyen et al.
2006/0205342 A1 * 9/2006 McKay et al. ............... 455/11.1
2007/0082622 A1 * 4/2007 Leinonen et al. ............... 455/78

FOREIGN PATENT DOCUMENTS

CA 2 224 899 7/1998
KR 20030058414 A * 7/2003

OTHER PUBLICATIONS

"Capacity Improvement by Adaptive Channel Allocation", H. Eriksson, IEEE Global Telecom. Conference, pp. 1355-1359, Nov. 28, Dec. 1, 1988.*

* cited by examiner

*Primary Examiner* — Temesgh Ghebretinsae
*Assistant Examiner* — Gennadiy Tsvey

(57) ABSTRACT

A transceiver with an adaptable filter and a method of controlling the settings of the filter to adapt to local channel assignments and usage are provided. The adaptable filter is connected in at least one of the transmitter path and the receiver path of the transceiver to separate signals from adjacent spectrum blocks to permit use of all of the channels in the adjacent spectrum blocks and to separate signals in adjacent or nearby channels in a shared-channel block. A method and system for forward link control signaling are provided. The forward link control signaling includes a frame for transmission that includes at least one control channel that includes control information for receivers sharing a common characteristic, and a guide channel that includes information pertaining to the at least one control channel, including control information for receivers sharing a common characteristic.

9 Claims, 23 Drawing Sheets

| | Change rate of size of information block | Transmission Rate of information block | MCS (modulation and coding scheme) | MS to target | Maximum length estimation (5MHz bandwidth) |
|---|---|---|---|---|---|
| System Information (SI) | No Change | 500ms (fixed) | Most robust. Target cell edge | All types of MSs | < 256 bytes |
| System Configuration (SC) | Changes: a few minutes | A few seconds | Most robust. Target cell edge | All types of MSs | < 256 bytes |
| Neighbor Info/ Config | Changes: a few minutes | A few seconds | Most robust. Target cell edge | All types of MSs | <256 bytes |
| Access Ack (AA) | Changes (depending on the access traffic) | Random | Most robust. Target cell edge | Initial access MS and idle MSs | < 32 bytes |
| Paging | Per frame | Random | Most robust. Target cell edge | Idle MSs | < 32 bytes |
| F-PC | Changes: a few minutes, synched with System Configuration | Every frame | Most robust. Target cell edge | Active MSs | < 16 bytes (128 bits) |
| F-ACK | Changes: every frame | Every frame (can be absorbed to assignment) | Most robust. Target cell edge | Active MSs | < 16 bytes (128 bits) |
| Assignment | Changes: every frame | Every frame | Split into three parts with each part serves one group of MS among three groups (each group requires a different MCS) | All MSs | < 64 bytes |

FIG. 9

| Control Information Block | Physical Channel |
|---|---|
| | Guide Channel |
| System Information (SI) | System Information channel (SICh) |
| System Configuration (SC) | System Configuration channel (SCCh) |
| Neighbor Information Configuration (NI) | Neighbor Information channel (NICh) |
| Access Acknowledgment (AA) | Access Acknowledgment channel (AACh) |
| Paging (PG) | Paging channel (PGCh) |
| F-PC | Power Control channel (PCCH) |
| F-ACK | No PHY channel (Absorbed into assignment for Hybrid H-ARQ scheme and asynchronous H-ARQ scheme) |
| Assignment 1,2,3 | Assignment channels (ASCh1,2,3) |

FIG. 10

| Name | Size (bits) | Description |
|---|---|---|
| Superframe number | 6 (500ms cycle) | Indicate the superframe number (0-49) |
| Configuration Information Block flag | 1 | 1: The field of Configuration Information Block Length will indicate the length of System configuration Block<br>0: the field will indicate the count of current System Configuration Block and the forecast of next System Configuration Block transmission |
| Configuration Information Block Length (implies the number of BAUs) | 5 + BW(MHz)/5 | If Configuration Information Block flag is set to 1: Indicates the length of Configuration Information Block length (in byte)<br>If Configuration Information Block flag is set to 0: for odd number of Superframe number, this field indicates the count of current Configuration Information Block; for even number of Superframe number, this field (b5-b1) indicates the forecast of next Configuration Information Block transmission (in 10 super-frames) and (b0, current/new) flags a new SC block |
| Neighbor Information Block flag | 1 | 1: The field of Configuration Information Block Length will indicate the length of Neighbour configuration Block<br>0: the field will indicate the count of current Neighbor Configuration Block and the forecast of next Neighbour Information Block transmission |
| Neighbor Information Block Length | 5 + BW(MHz)/5 | If Neighbor Information Block flag is set to 1: Indicates the length of Neighbor Information Block length (in byte)<br>If Neighbor Information Block flag is set to 0: for odd number of Superframe number, this field indicates the count of current Neighbor Information Block; for even number of Superframe number, this field (b5-b1) indicates the forecast of next Neighbor Information Block transmission (in 10 super-frames) and (b0, current/new) flags a new NI block |
| Access Ack Block Length | 4 + BW(MHz)/5 | Indicate the length of Access Ack Block (in byte) |
| Page Block Length | 4 + BW(MHz)/5 | Indicate the length of Page Block (in byte) |
| Assignment 1 Block length | 5 + BW(MHz)/5 | Indicate the length of Access Ack Block (in byte) |
| Assignment 2 Block length | 5 + BW(MHz)/5 | Indicate the length of Access Ack Block (in byte) |
| Assignment 3 Block length | 5 + BW(MHz)/5 | Indicate the length of Access Ack Block (in byte) |

FIG. 11

| Control Information Block | Physical Channel |
|---|---|
| Guide Information block (fixed size) Format is the same as in approach 1 | Guide Channel |
| System Information (SI) System Configuration (SC) Neighbor Information Configuration (NI) Access Acknowledgment (AA) Paging (PG) | Common Control channel (CCCh) |
| F-ACK | No corresponding physical channel (Absorbed into assignment blocks) |
| F-PC | PCCh |
| Assignment 1,2,3 | Assignment channels (ASCh1,2,3) |

FIG. 13

| Control Information block | Physical channel |
|---|---|
| Guide Information block (fixed size) Format is the same as in approach 1 | Guide Channel |
| System Information (SI) System Configuration (SC) Neighbor Information Configuration (NI) | Common Control channel (CCCh) |
| Access Acknowledgment (AA) Paging (PG) | Transition Control channel (TCCh) |
| F-ACK | No corresponding physical channel (Absorbed into assignment blocks) |
| F-PC | PCCh |
| Assignment 1,2,3 | Assignment channels (ASCh1,2,3) |

FIG. 15

METHOD AND APPARATUS FOR ADAPTIVE CHANNEL UTILISATION

RELATED APPLICATION

This application claims the benefit of prior U.S. provisional application No. 60/785,482 filed Mar. 24, 2006, hereby incorporated by reference in its entirety.

FIELD OF THE INVENTION

The invention pertains to the field of wireless communication and more particularly to channel utilisation and forward link control signaling in wireless communication.

BACKGROUND OF THE INVENTION

In some assignments of radio spectrum, channels from adjacent blocks may be allocated to the same operator but for different operations. The operation may require transmissions in one block and reception in the adjacent block. Various operators may have channels assigned at the common edge between blocks, which are called edge channels, such that all the available channels in both blocks are allocated. However, a mobile unit that is capable of universal operation such that the mobile unit is capable of flexibly receiving and transmitting across all channels in each block, including the edge channels, does not currently exist.

In order to transmit and receive in adjacent blocks of the radio spectrum, a filter is used to separate a transmit signal in one block from a receive signal in the adjacent block. Conventional systems that use adjacent blocks of spectrum separate the signals using filters with a transition band between the channels in operation. In the case of adjacent or very closely adjacent channel assignments, the transition band of the filter overlaps one or more of the desired channels and hence renders that channel unusable for the system. These unusable channels are commonly referred to as transition band guard-channels. This results in a loss of spectrum availability and loss of universality of access to the services by generic mobile units. So far, this problem has thwarted the commercial use of such adjacent spectrum assignments as generic mobile user equipment (UE) cannot be produced. As a result, radio spectrum owners are unable to fully utilize the radio spectrum which they have paid to purchase. For example, in the IMT-2000 mobile bands in Europe and many other areas of the world, the entire auxiliary band from 1900 MHz to 1920 MHz is currently unutilized because of this problem. There is ongoing discussion in the 3rd Generation Partnership Project (3GPP) on topics of using unpaired channels in the auxiliary band, particularly for Broadcast TV services; however the problem described above has thus far prevented such a use.

Wireless access networks use control signaling to manage their operation. In some systems (e.g. 1xEV-DO) the various physical control channels are designed to carry fixed sized control signaling. This is inefficient for handling variable sized control signaling for broadband access systems. To avoid this problem control signaling is transmitted using messages on a broadcast channel on some networks (e.g. IEEE 802.16 based networks). That is to say, a dedicated control channel concept is not used. The problem is that such an approach introduces additional overhead, such as message type and CID to identify recipient and so on.

SUMMARY OF THE INVENTION

According to one broad aspect of the present invention, there is provided a transceiver comprising: a transmitter, a receiver; and at least one of the following: a) an adjustable filter provided in the transmitter; and b) an adjustable filter provided in the receiver, each adjustable filter having at least one transition band adjustable under control of the transceiver to suit spectrum block operating assignments.

In some embodiments, each adjustable filter is operable to selectively place a respective transition band of its at least one transition band on a first side or a second side of a boundary between respective adjacent spectrum blocks in the spectrum block operating assignments.

In some embodiments, the transceiver comprises both: a) the adjustable filter provided in the transmitter; and b) the adjustable filter provided in the receiver.

In some embodiments, at least one of the adjustable filter(s) comprises at least one tuning element.

In some embodiments, the at least one tuning element comprises at least one of a varactor diode and a capacitor with a switch.

In some embodiments, at least one of the adjustable filter(s) comprises a plurality of fixed filters selectable by at least one switch.

In some embodiments, the transceiver further comprises a configuration memory operable to store a record of adjustable filter configurations for the spectrum block operating assignments; the transceiver operable to adjust each adjustable filter according to the record stored in the configuration memory for a given spectrum block operating assignment.

In some embodiments, the transceiver further comprises a location memory operable to store a record of adjustable filter configurations associated with particular locations; the transceiver operable to adjust each adjustable filter according to the record stored in the location memory for a given particular location.

In some embodiments, the spectrum block operating assignments are for the IMT-2000 bands.

In some embodiments, the adjustable filter in the transmitter is operable to selectively place a respective transition band of the at least one transition band of the adjustable filter in the transmitter on a first side or a second side of a boundary between respective adjacent spectrum blocks in the spectrum block operating assignments; and the adjustable filter in the receiver is operable to selectively place a respective transition band of the at least one transition band of the adjustable filter in the receiver on a first side or a second side of a boundary between respective adjacent spectrum blocks in the spectrum block operating assignments.

In some embodiments, the spectrum block operating assignments are for the IMT-2000 bands and the respective adjacent spectrum blocks comprise at least one of: a Universal Mobile Telephone System (UMTS) Time Domain Duplex (TDD) block spanning 1900 MHz to 1920 MHz and a UMTS block spanning 1920 MHz to 1980 MHz; the UMTS block spanning 1920 MHz to 1980 MHz and a Mobile Satellite Service (MSS) block spanning 1980 MHz to 2010 MHz; the MSS block spanning 1980 MHz to 2010 MHz and a UMTS TDD block spanning 2010 MHz to 2025 MHz; and a UMTS block spanning 2110 MHz to 2170 MHz and a MSS block spanning 2170 MHz to 2200 MHz.

In some embodiments, the spectrum block operating assignments comprise a shared-channel block assignment according to a channel usage plan for a group comprising the transceiver and at least one other transceiver; and each adjustable filter is operable to selectively place a respective transition band of its at least one transition band to separate channels in the shared-channel block.

According to another broad aspect of the present invention, there is provided a method of adjusting a transceiver comprising at least one of the following: a) adjusting at least one transition band of a filter in a transmitter of the transceiver; and b) adjusting at least one transition band of a filter in a receiver of the transceiver, according to at least one of information received from a network, pre-programmed information and information stored from previous use.

In some embodiments, the information stored from previous use comprises information about usage at locations and the transceiver is adjusted according to a location of the transceiver together with the stored information about previous usage at the location.

In some embodiments, the method further comprises re-adjusting the transceiver as needed in event of a change in local conditions of use.

In some embodiments, the change in local conditions of use comprises any one of a handover to a new network access point and a change of channel assignment.

In some embodiments, the change of channel assignment is as a result of any one of load balancing, a change of service request and a change in channel usage by another transceiver in a shared-channel assignment.

In some embodiments, adjusting at least one transition band comprises selectively placing a respective transition band of the at least one transition band on a first side or a second side of a boundary between respective adjacent spectrum blocks in a spectrum block operating assignment.

In some embodiments, the method comprises both: a) adjusting at least one transition band of the filter in the transmitter of the transceiver; and b) adjusting at least one transition band of the filter in the receiver of the transceiver, according to at least one of information received from a network, pre-programmed information and information stored from previous use.

In some embodiments, adjusting at least one transition band comprises selectively placing a respective transition band of the at least one transition band to separate channels in a shared-channel block according to a channel usage plan for a group comprising the transceiver and at least one other transceiver.

According to yet another broad aspect of the present invention, there is provided a method comprising: provisioning a frame for transmission; said frame including at least one control channel including control information for receivers sharing a common characteristic; said frame including a guide channel; and said guide channel including information pertaining to the at least one control channel including control information for receivers sharing a common characteristic.

In some embodiments, said common characteristic includes modulation and coding.

In some embodiments, said common characteristic includes operating mode.

According to still another broad aspect of the present invention, there is provided a system comprising: control circuitry operable to: provision a frame for transmission; said frame including at least one control channel including control information for receivers sharing a common characteristic; said frame including a guide channel; and said guide channel including information pertaining to the at least one control channel including control information for receivers sharing a common characteristic.

In some embodiments, said common characteristic includes modulation and coding.

In some embodiments, said common characteristic includes operating mode.

Some embodiments of the present invention include forward link control channel systems and methods which enable support of variable sized control signaling.

Some embodiments of the present invention include forward link control channel systems and methods which involve minimal control signaling overhead.

Some embodiments of the present invention include forward link control channel systems and methods which ensure mobile power efficiency.

Some embodiments of the present invention include forward link control channel systems and methods where each type of control information block transmitted by corresponding physical channel.

Some embodiments of the present invention include forward link control channel systems and methods where control information blocks having the same modulation and coding are inserted into the same control channel.

Some embodiments of the present invention include forward link control channel systems and methods where control information blocks relating to mobiles having the same modes are inserted into the same respective control channel.

Some embodiments of the present invention include forward link control channel systems and methods where control information blocks relating to mobiles having the same modes are inserted into the same respective control channel where the modes can include active or non-active modes.

Some embodiments of the present invention include forward link control channel systems and methods where a guide channel is used as a pointer to relevant control information or a physical control channel.

Some embodiments of the present invention include forward link control channel systems and methods where a guide channel is used as a pointer to relevant control information and where the guide channel has known size and is coded with a known coding and modulation scheme.

Some embodiments of the present invention include forward link control channel systems and methods where a guide channel is used as a pointer to relevant control information including:
  Which user is to decode information
  When (which slot/frame) to decode the relevant information; and
  Where (in one slot/frame) to decode the relevant information Some embodiments of the present invention include forward link control channel systems and methods which can adaptively switch between the various forward link channel approaches based on different traffic characteristics.

Other aspects and features of the present invention will become apparent, to those ordinarily skilled in the art, upon review of the following description of the specific embodiments of the invention.

BRIEF DESCRIPTION OF THE DRAWINGS

Embodiments of the invention will now be described in greater detail with reference to the accompanying diagrams, in which:

FIG. 9 is a table listing properties for various forward link control information types;

FIG. 10 is a table of a mapping of control information blocks on physical channels in accordance with an embodiment of the present invention;

FIG. 11 is a table of an example of a Guide Block Information format in accordance with an embodiment of the present invention;

FIG. 13 is a table of an example of a mapping of control information block on physical channels in accordance with an embodiment of the present invention;

FIG. 15 is a table of an example of a mapping of control information block on physical channels in accordance with an embodiment of the present invention;

DETAILED DESCRIPTION

Various methods and systems are provided that enable mobile terminal units to adapt their operation to permit use of all channels in adjacent or nearly adjacent spectrum blocks without the need for unassigned or unusable transition band guard-channels between the blocks of spectrum. Adaptive channel filters with adjustable transition bands are used in order to utilize all of the channels in adjacent spectrum blocks. Embodiments of the invention support configurations of Frequency Division Duplexing (FDD) or Time Division Duplexing (TDD) and are applicable to all modulation formats including amplitude, frequency or phase modulation and Code Division Multiple Access (CDMA), Time Division Multiple Access (TDMA), Frequency Division Multiple Access (FDMA), Orthogonal Frequency Division Multiplexing (OFDM), as well as various combinations and variations of the foregoing.

Other embodiments of the present invention provide for the construction and operation of a universal transceiver that is able to access services across all operators with different operations in adjacent spectrum bands; therefore an operator is not disadvantaged as a result of being assigned channels at the edge of adjacent spectrum bands. Although embodiments of the present invention are particularly applicable to the "unpaired" channels available for the IMT-2000/UMTS assignments in Europe and globally, and are described in this context below, they are also applicable to any spectrum block operating assignment that includes adjacent or nearly adjacent operational bands. For example, embodiments of the present invention are also applicable to spectrum block operating assignments that include adjacent bands shared between satellite and terrestrial communications services.

Figure 1:
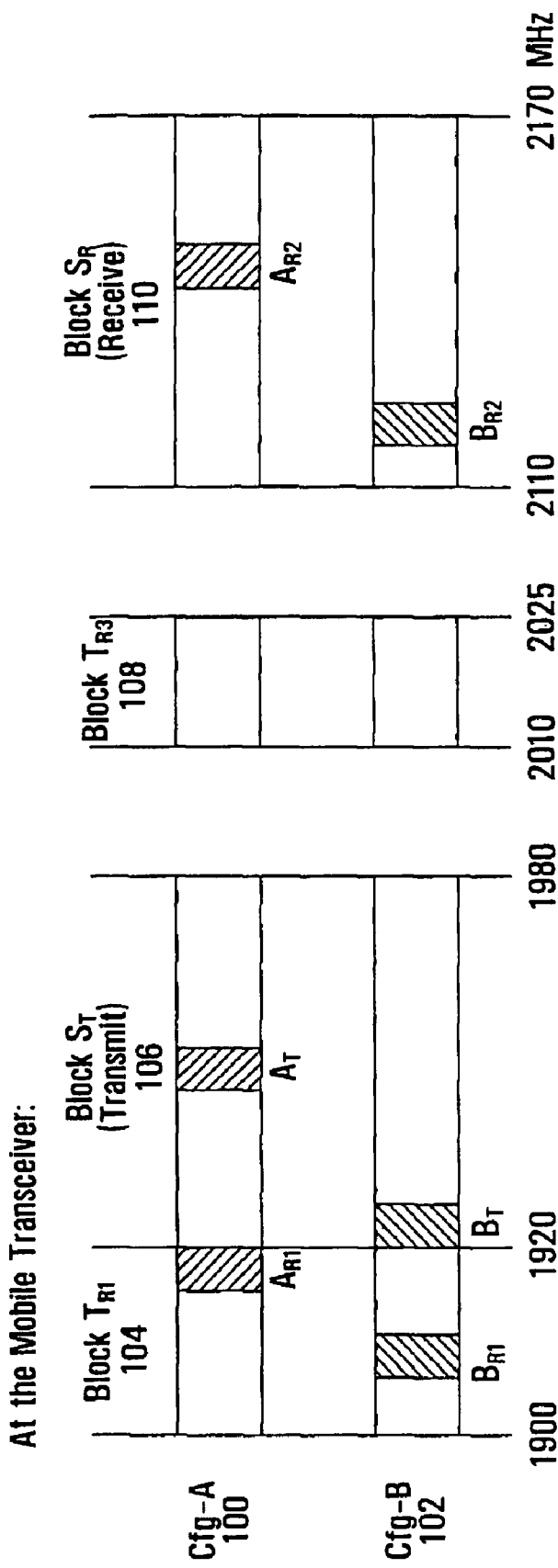
FIG. 1 is a chart of a radio spectrum assignment in the IMT-2000 mobile band showing two channel configurations.

FIG. 1 illustrates an example of an assignment of radio spectrum, which includes adjacent transmit/receive blocks, for the channels allocated for the IMT-2000 mobile bands in Europe and many other areas of the world. The radio spectrum shown in FIG. 1 spans from 1900 MHz to 2170 MHz and is divided into four blocks, namely block $T_{R1}$ 104 spanning 1900 MHz to 1920 MHz, transmit block $S_T$ 106 spanning 1920 MHz to 1980 MHz, block $T_{R3}$ 108 spanning 2010 MHz to 2025 MHz and receive block $S_R$ 110 spanning 2110 MHz to 2170 MHz. In conventional systems, Block $T_{R1}$ 104 and Block $T_{R3}$ 108 are either unused or are utilized for UMTS time domain duplexing. In general, the blocks 104 and 108 could be used for either transmit or receive functions at the mobile transceiver or user equipment (UE). The transmit and receive operations illustrated in FIG. 1 are those as seen by a mobile transceiver or user equipment.

In FIG. 1, two example spectrum configurations Cfg-A 100 and Cfg-B 102 are illustrated. A spectrum configuration defines which channel or channels are used by a UE in one or more operational blocks. In spectrum configuration Cfg-A 100, channels are arranged such that reception (Rx) is in receive block $S_R$ 110 channel $A_{R2}$ and transmission (Tx) is in transmit block $S_T$ 106 channel $A_T$. Receive channel $A_{R2}$ and transmit channel $A_T$ are referred to as paired channels, because together they allow for duplex communication, i.e. transmit and receive. An auxiliary channel assignment for reception is also provided for Cfg-A 100 in receive block $T_{R1}$ 104 channel $A_{R1}$. This auxiliary receive channel $A_{R1}$ is referred to as an unpaired channel because it does not have a corresponding transmission channel that it is paired with. It can be seen from this example that the receive channel $A_{R1}$ is immediately adjacent to the transmit block $S_T$ 106 and that transmit block $S_T$ 106 is operated for transmissions while receive block $T_{R1}$ 104 is used for reception. Another spectrum assignment configuration Cfg-B 102 may be used by another operator, or by the same operator in another area. In Cfg-B 102, channels are arranged such that reception is in receive block $S_R$ 110 channel $B_{R2}$ and transmissions are in transmit block $S_T$ 106 channel $B_T$. An auxiliary receive channel assignment is also provided in this configuration in block $T_{R1}$ 104 channel $B_{R1}$. It can be seen from this example that the transmit Channel $B_T$ is immediately adjacent to the receive block $T_{R1}$ 104.

Two specific spectrum configurations have been shown in FIG. 1. More generally, a spectrum configuration, for the purpose of the spectrum blocks defined in FIG. 1, include a receive channel somewhere in block $S_R$ 110, a receive channel somewhere in block $T_{R1}$ 104 and a transmit channel somewhere in block $S_T$ 106.

In theory, a mobile transceiver can be assigned an arbitrary spectrum configuration, and fixed filters in the mobile transceiver may be used to separate the transmit signals in the transmit block $S_T$ 106 from the receive signals in the receive block $T_{R1}$ 104. However, such filters are difficult to devise, as two of the channels $A_{R1}$ and $B_T$ are adjacent. Thus, a mobile transceiver operator with Cfg-A 100 needs to block $A_{R1}$ and pass $A_T$ for transmission, and block $A_T$ and pass $A_{R1}$ for reception. The same mobile transceiver with Cfg-B 102 needs to block $B_{R1}$ and pass $B_T$ for transmission, and block $B_T$ and pass $B_{R1}$ for reception. There is no region for a transition band for a fixed frequency filter that would allow the use of both $A_{R1}$ in Cfg-A and $B_T$ in Cfg-B 102.

Figure 2:
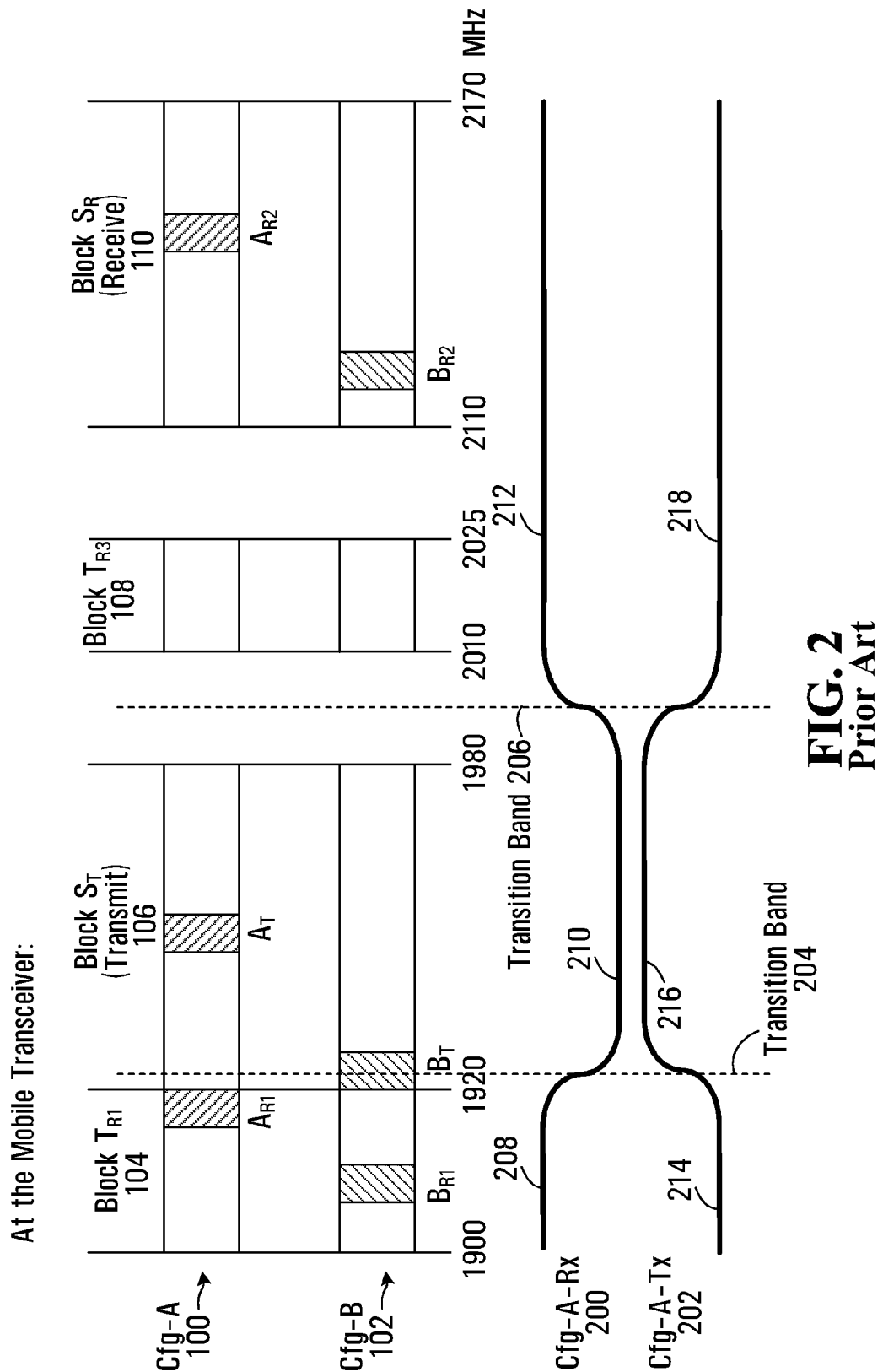
FIG. 2 is a chart of a radio spectrum assignment in the IMT-2000 mobile band showing two channel configurations and a filter configuration suitable for only one of the channel configurations.

FIG. 2 illustrates the problem associated with the use of fixed frequency filters in conventional wireless transceivers. In a conventional wireless transceiver designed for working with spectrum configuration Cfg-A 100, a fixed frequency Rx filter and a fixed frequency Tx filter would be used in its receiver (Rx) and its transmitter (Tx), respectively, as shown by the frequency responses Cfg-A-Rx 200 and Cfg-A-Tx 202 respectively. Cfg-A-Rx 200 has a first passband 208 that includes the entirety of the receive block $T_{R1}$ 104. The first passband 208 transitions through a first transition band 204 to a stopband 210 in the transmit block $S_T$ 106 above 1920 MHz. The stopband 210 of the receive filter transitions to a second passband 212 through a second transition band 206. The second transition band 206 is located between the end of the transmit block $S_T$ 106 and the beginning of the receive block $T_{R3}$ 108. The second passband 212 includes the entireties of the receive blocks $T_{R3}$ 108 and $S_R$ 110. Cfg-A-Tx 202 has a first stopband 214 that includes the entirety of the receive block $T_{R1}$ 104. The first stopband 214 transitions through the first transition band 204 to a passband 216 in the transmit block $S_T$ 106 above 1920 MHz. The passband 216 of the transmit filter transitions to a second stopband 218 through the second transition band 206. The second stopband 218 includes the entireties of the receive blocks $T_{R3}$ 108 and $S_R$ 110. The first passband 208 of the Cfg-A-Rx 200 allows reception of $A_{R1}$ and more generally any channel in receive block $T_{R1}$ 104. The second passband 212 of the Cfg-A-Rx 200 allows the reception of receive channel $A_{R2}$ and more generally any channel in receive blocks $T_{R3}$ 108 and $S_R$ 110. The passband 216 of the Cfg-A-Tx 202 allows transmission of transmit channel $A_T$ and more generally any channel in transmit block $S_T$ 106 above the first transition band 204. In this example, the first transition band 204 overlaps the occupied channel $B_T$ of Cfg-B 102. This would prevent the universal operation of the conventional transceiver as it would be unable to work with the spectrum channel assignment shown for Cfg-B 102 in channel $B_T$. The user of a wireless transceiver may wish to switch from one spectrum channel configuration to another for many reasons. For example, the user may wish to switch from spectrum channel configuration Cfg-A 100 to spectrum channel configuration Cfg-B 102 to access the services of an operator using Cfg-B 102, or because Cfg-B 102 is used by the user's service provider in another region.

Figure 3:
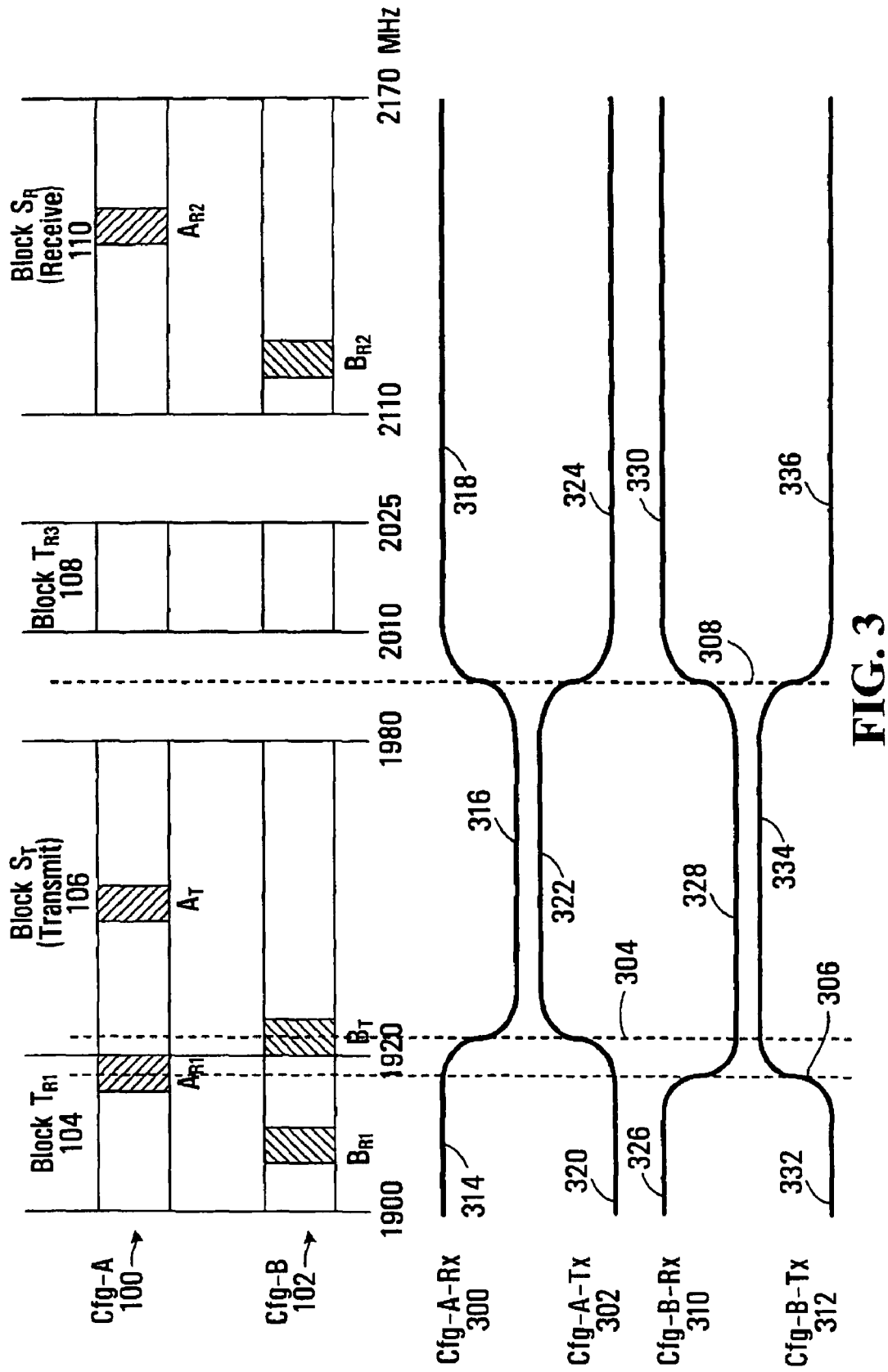
FIG. 3 is a chart of a radio spectrum assignment in the IMT-2000 mobile band showing two channel configurations and two corresponding adaptive filter configuration in accordance with an embodiment of the invention.

In a wireless transceiver in accordance with an embodiment of the present invention, an adjustable adaptive channel filter is used in at least one of a receiver and a transmitter of the wireless transceiver in order to accommodate the use of all of the channels in adjacent blocks in different spectrum channel assignments. Such a transceiver could, for example, be used for both channel configurations Cfg-A 100 and Cfg-B 102. For example, FIG. 3 illustrates two frequency responses Cfg-A-Rx 300 and Cfg-B-Rx 310 of an adjustable Rx filter and two frequency responses Cfg-A-Tx 302 and Cfg-B-Tx 312 of an adjustable Tx filter corresponding to the two channel configurations Cfg-A 100 and Cfg-B 102 of a radio spectrum assignment identical to the radio spectrum assignment shown in FIG. 1 in accordance with an embodiment of the invention.

Cfg-A-Rx 300 has a first passband 314 that includes the entirety of the receive block $T_{R1}$ 104. The first passband 314 transitions through a first transition band 304 to a stopband 316 in the transmit block $S_T$ 106 above 1920 MHz. The stopband 316 of the receive filter transitions to a second passband 318 through a second transition band 308. The second transition band 308 is located between the end of the transmit block $S_T$ 106 and the beginning of the receive block $T_{R3}$ 108. The second passband 318 includes the entireties of the receive blocks $T_{R3}$ 108 and $S_R$ 110. Cfg-A-Tx 302 has a first stopband 320 that includes the entirety of the receive block $T_{R1}$ 104. The first stopband 320 transitions through the first transition band 304 to a passband 322 in the transmit block $S_T$ 106 above 1920 MHz. The passband 322 of the transmit filter transitions to a second stopband 324 through the second transition band 308. The second stopband 324 includes the entireties of the receive blocks $T_{R3}$ 108 and $S_R$ 110. The first passband 314 of the Cfg-A-Rx 300 allows reception of $A_{R1}$ and more generally any channel in receive block $T_{R1}$ 104. The second passband 318 of the Cfg-A-Rx 300 allows the reception of receive channel $A_{R2}$ and more generally any channel in receive blocks $T_{R3}$ 108 and $S_R$ 110. The passband 322 of the Cfg-A-Tx 302 allows transmission of transmit channel $A_T$ and more generally any channel in transmit block $S_T$ 106 above the first transition band 304.

Cfg-B-Rx 310 has a first passband 326 that transitions to a stopband 328 through a first transition band 306 in the receive block $T_{R1}$ 104 below 1920 MHz. The stopband 328 transitions to a second passband 330 through the second transition band 308. The second passband 330 includes the entireties of the receive blocks $T_{R3}$ 108 and $S_R$ 110. Cfg-B-Tx 312 has a first stopband 332 that transitions to a passband 334 through the first transition band 306 in the receive block $T_{R1}$ 104 below 1920 MHz. The passband 334 transitions to a second stopband 336 through the second transition band 308. The second stopband 336 includes the entireties of the receive blocks $T_{R3}$ 108 and $S_R$ 110. The first passband 326 of the Cfg-B-Rx 310 allows reception of $B_{R1}$ and more generally any channel below the first transition band 306 in receive block $T_{R1}$ 104. The second passband 330 of the Cfg-B-Rx 310 allows the reception of receive channel $A_{R2}$ and more generally any channel in receive blocks $T_{R3}$ 108 and $S_R$ 110. The passband 334 of the Cfg-B-Tx 312 allows transmission of transmit channel $B_T$ and more generally any channel in transmit block $S_T$ 106.

For spectrum configuration Cfg-A 100, the transition band 304 of the adjustable Rx filter and the adjustable Tx filter is set above the 1920 MHz boundary between the receive block $T_{R1}$ 104 and the transmit block $S_T$ 106 such that the first passband 314 of the adjustable Rx filter and the stopband 320 of the adjustable Tx filter include the edge receive channel $A_{R1}$ and the stopband 316 of the adjustable Rx filter and the passband 322 of the adjustable Tx filter include the transmit channel $A_T$ in transmit block $S_T$ 106. For the spectrum configuration Cfg-B 102, the transition band 306 of the adjustable Rx filter and the adjustable Tx filter is set below the 1920 MHz boundary between the receive channel $B_{R1}$ and the transmit channel $B_T$ such that the first passband 326 of the adjustable Rx filter and the stopband 332 of the adjustable Tx filter include the receive channel $B_{R1}$ and the stopband 328 of the adjustable Rx filter and the passband 334 of the adjustable Tx filter include the transmit edge channel $B_T$ in transmit block $S_T$ 106.

While the frequency responses Cfg-A-Rx 300, Cfg-B-Rx 310 and Cfg-A-Tx 302, Cfg-B-Tx 312 indicate that the transition frequencies of the transition bands of the receive filter and the transmit filter overlap, in general, the transition frequencies of the receive filter and the transmit filter, may be placed independently of one another such that they are placed anywhere between channels with different operations that are to be separated.

For example, for the spectrum configuration Cfg-A 100 illustrated in FIG. 3, the transition between the stopband 320 and the passband 322 of the Tx filter might take place at a higher frequency than the transition between the passband 314 and the stopband 316 of the Rx filter so that the transition between the passband 314 and the stopband 316 of the Rx filter is at a transition frequency just above the receive channel $A_{R1}$ and the transition between the stopband 320 and the passband 322 of the Tx filter is at a transition frequency just below the transmit channel $A_T$.

Similarly, the transition between the stopband 316 and the passband 318 of the Rx filter and the transition between the passband 322 and the stopband 324 of the Tx filter may be independently located anywhere between the transmit channel $A_T$ and the receive channel $A_{R2}$.

For example, the transition between the stopband 316 and the passband 318 of the Rx filter could be located just below the receive channel $A_{R2}$ and the transition between the passband 322 and the stopband 324 of the Tx filter could be located just above the transmit channel $A_T$.

Limiting the passbands by locating the transition bands between stopbands and passbands and between passbands and stopbands as described above may be beneficial from a noise performance standpoint. For example, limiting the bandwidth of the passband 318 by moving the transition between the stopband 316 and the passband 318 to a transition frequency that is just below the receive channel $A_{R2}$ in receive block $S_R$ may reduce the amount of noise received, as it would result in an effective reduction of the bandwidth of the passband 318 and hence a reduction in the bandwidth of the noise that is received.

Some embodiments include enhancements to signaling in order to support the delivery of services on more than one channel, for example the two receive channels $A_{R1}$ and $A_{R2}$ in FIG. 3, and to indicate the configurations of the channels. For example, in the embodiment for UMTS channels shown in FIG. 3, paired channels, such as $A_T$ paired with $A_{R2}$ and $B_T$ paired with $B_{R2}$, are assigned with a fixed relation between them. Auxiliary channels in blocks $T_{R1}$ 104 and $T_{R3}$ 108, such as $A_{R1}$ and $B_{R1}$ in $T_{R1}$ 104, also typically have a fixed relation to the paired channels. In some embodiments, more than one pair may have the same auxiliary channel assignment. In embodiments with a fixed relation between the paired channels and the auxiliary channels, when a terminal detects the paired channels, the associated auxiliary channels would be known. In this case signaling may not be needed to indicate which auxiliary channels to use. However, the auxiliary channels may not be active in all areas, and so some signaling may be used to, for example, indicate that the services on the auxiliary channels are available (e.g. a broadcast service on the auxiliary channels). In a more general case however, there might not be a fixed relation between the channels, and signaling would be used from network base stations to the user terminals to indicate the availability of the auxiliary channels and their location (centre frequency). In some embodiments, the user terminal might first tune to the paired channels to learn about the auxiliary channels, and in other cases the user terminal could tune to an auxiliary channel and receive information about the associated paired channels. While generally both the paired channels and the auxiliary channels would be used together, in some cases they could be used independently. For example a broadcast service on the auxiliary channel could be accessed independently of any use of the paired channels.

In FIG. 3, the spectrum block assignment is such that two alternative frequency responses of the adjustable Rx and Tx filters are sufficient. Of course there may be other spectrum block assignments for which more than two frequency responses are required. In the spectrum block assignment shown in FIG. 3, only two spectrum blocks with different operational functions are adjacent or nearly adjacent, i.e. receive block $T_{R1}$ 104 and transmit block $S_T$ 106. In other spectrum block assignments there may be more than one pair of adjacent spectrum blocks with different operational functions that need to be separated via filtering. The apparatuses and methods in accordance with embodiments of the present invention are equally applicable to these other scenarios. For example, FIGS. 4 to 6, which will be described in detail below, illustrate an example of a spectrum assignment in which an adjustable Rx filter and an adjustable Tx filter are adjusted to provide three frequency responses in order to accommodate edge channels at two adjacent spectrum boundaries.

Figure 4:
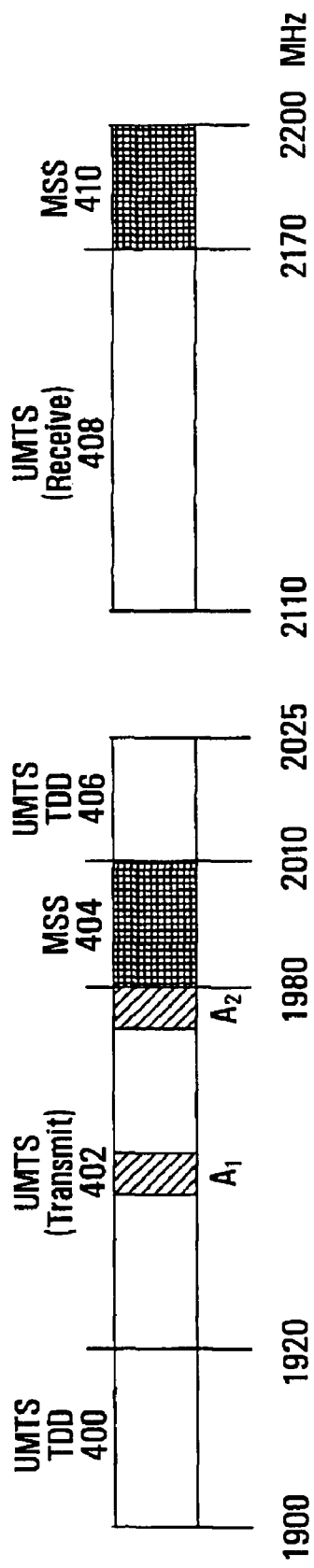
FIG. 4 is a chart of a radio spectrum assignment in the IMT-2000 mobile band, including Mobile Satellite Service bands, showing two channel configurations.

FIG. 4 illustrates an example of an assignment for the channels allocated for the IMT-2000 mobile bands in Europe, and many other areas of the world, including the Mobile Satellite Service (MSS) bands 404 and 410. In this example, a first Universal Mobile Telephone System (UMTS) Time Domain Duplex (TDD) band 400 (1900-1920 MHz) is located at the low end of the spectrum assignment and is adjacent to a UMTS transmit band 402 (1920-1980 MHz). The first MSS band 404 (1980-2010 MHz) is adjacent to the UMTS transmit band 402 and is also adjacent to a second UMTS TDD band 406 (2010-2025 MHz). A UMTS receive band 408 (2110-2170 MHz) is adjacent to the second MSS band 410 (2170-2200 MHz). As can be seen from this example, if the UE is transmitting on a channel away from an edge of its UMTS transmit band 402, such as indicated by channel $A_1$, then there is room in the UMTS transmit band 402 for a filter transition to permit reception of satellite signals in the first MSS band 404. However, if the UE is assigned a channel at the edge, such as indicated by channel $A_2$, then there is not room for a filter transition in the UMTS transmit band 402.

Adaptive filter techniques according to an embodiment of the invention are provided to permit the UE to accommodate operations in both the UMTS transmit 402, UMTS receive 408 and MSS bands 404, 410, as well as the UMTS TDD bands 400, 406. The adaptive filter technique adjusts one or more transition bands of a respective adjustable filter in at least one of the transmitter and the receiver of a transceiver in order to accommodate the use of the edge channels along the boundary between adjacent or nearly adjacent spectrum bands, thus allowing for the use of all of the channels in each of the spectrum bands in various channel configurations. An example of this is illustrated in the following FIG. 5.

Figure 5:
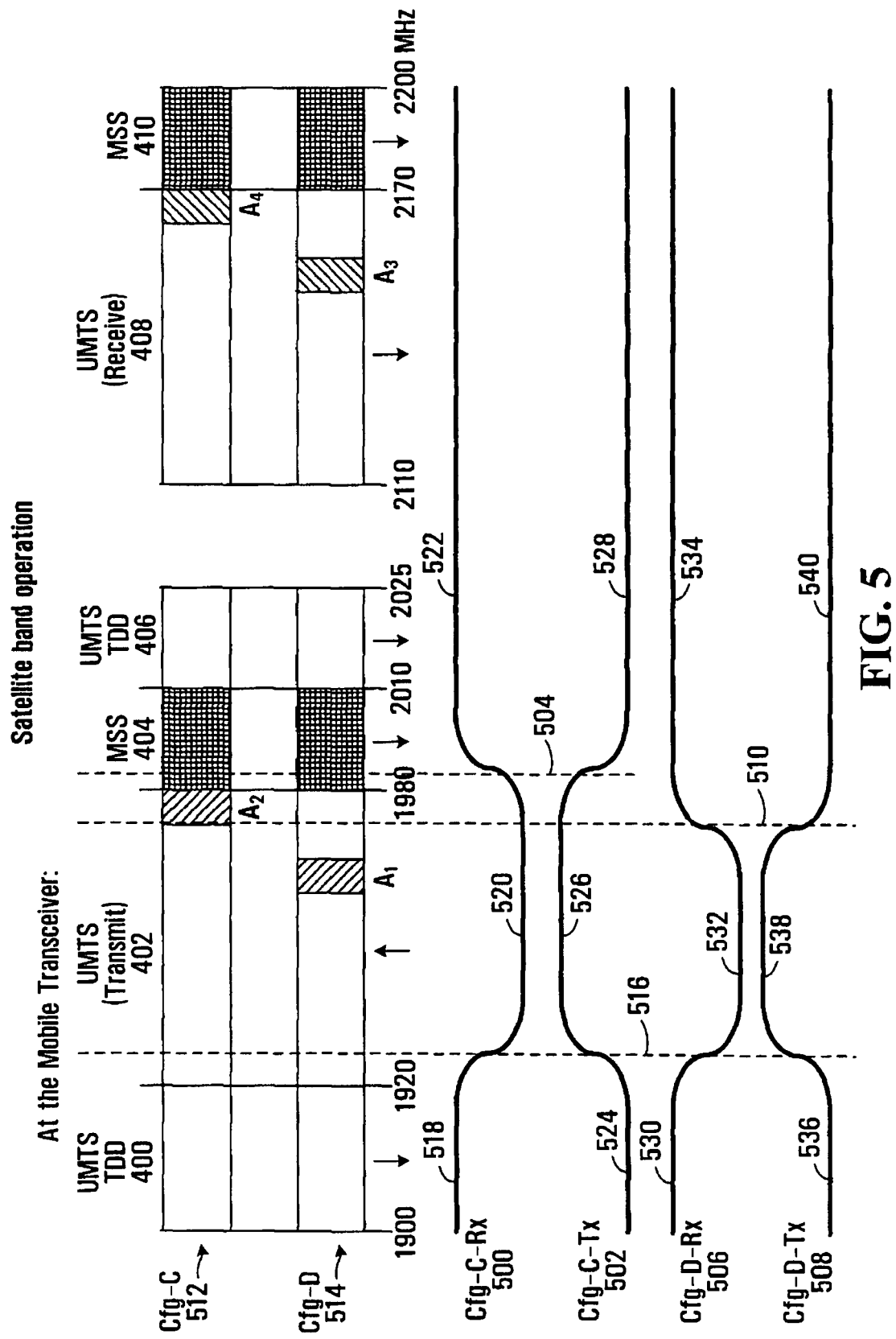
FIG. 5 is a chart of a radio spectrum assignment in the IMT-2000 mobile band, including Mobile Satellite Service bands, showing two channel configurations and two corresponding adaptive filter configurations in accordance with an embodiment of the invention.

FIG. 5 shows a first example channel configuration Cfg-C 512 in which a UMTS service channel $A_2$ in the UMTS transmit band 402 is immediately adjacent to the MSS channels in the MSS band 404. For this operation the UE adjusts an adjustable Rx filter in its receiver to have the frequency response Cfg-C-Rx 500 and adjusts an adjustable Tx filter in its transmitter to have the frequency response Cfg-C-Tx 502 in order to have a first transition band 516 above 1920 MHz in the UMTS transmit band 402 and a second transition band 504 above 1980 MHz in the MSS band 404. The first transition band 516 transitions the adjustable Rx filter from a first passband 518 to a stopband 520 and transitions the adjustable Tx filter from a first stopband 524 to a passband 526. The second transition band 504 transitions the adjustable Rx filter from the stopband 520 to a second passband 522 and transitions the adjustable Tx filter from the passband 526 to a second stopband 528. The first passband 518 of the adjustable Rx filter allows the reception of any channel in the UMTS TDD band 400. The passband 526 of the adjustable Tx filter allows the transmission of the edge transmit channel $A_2$ and more generally any channel in the UMTS transmit band 402 above the first transition band 516. The second passband 522 of the adjustable Rx filter allows the reception of any channel in the first MSS band 404 above the second transition band 504 and any channel in the UMTS TDD band 406, the UMTS receive band 408 or the second MSS band 410.

FIG. 5 also shows a second channel configuration Cfg-D 514 in which a UMTS service channel $A_1$ in the UMTS transmit band 402 is not at the edge of the UMTS transmit band 402. For this configuration Cfg-D 514, the UE adjusts its Rx filter to have the frequency response Cfg-D-Rx 506 and adjusts its Tx filter to have the frequency response Cfg-D-Tx 508 in order to have a transition band 510 at a frequency below 1980 MHz in the UMTS transmit band 402 rather than having the transition band 504 at a frequency above 1980 MHz in the first MSS band 404. This permits the UE to receive signals in the entirety of the first MSS band 404 rather than being limited to only channels above the transition band 504. In Cfg-D-Rx 506 and Cfg-D-Tx 508 the adjustable Rx filter and the adjustable Tx filter maintain the first transition band 516, such that they have a first passband 530 and a first stopband 536, respectively, below the first transition band 516 and a stopband 532 and a passband 538, respectively, above the first transition band 516. The transition band 510 transitions the stopband 532 and the passband 538 to a second passband 534 and a second stopband 540, respectively.

In the example channel configurations Cfg-C 512 and Cfg-D 514, the UE is shown as having a UMTS service channel $A_4$ and $A_3$, respectively, in the UMTS receive band 408. In the example channel configuration Cfg-C 512 the UMTS service channel $A_4$ is an edge channel located adjacent to the MSS band 410. In the example channel configuration Cfg-D 514 the UMTS service channel $A_3$ is located away from the edge of the UMTS receive band 408. The adaptive filter technique according to an embodiment of the present invention provides for the selective placement of a transition band between channels in adjacent or nearly adjacent spectrum bands with different operations, i.e. transmit and receive operations. Because the MSS band 410 is shown as being used for reception, similar to the UMTS receive band 408, an additional filter transition separating UMTS receive band 408 channels from MSS band 410 channels is not provided, i.e. the adjustable Rx filter is configured to pass all channels above the transition band 504 in Cfg-C 512 and above the transition band 510 in Cfg-D 514, including the channels $A_3$ and $A_4$ allocated in the UMTS receive band 408 and any channels allocated in the MSS band 410, and the adjustable Tx filter is configured to filter out all channels above the transition band 504 in Cfg-C 512 and above the transition band 510 in Cfg-D 514.

The MSS bands 404, 410 may be used for transmission or reception depending on the design of the MSS satellite system (or both if TDD is used). In FIG. 5, both of the MSS bands 404, 410 are shown as being used for reception. A further example shown in FIG. 6 illustrates the adaptation of the adjustable filters to a third example channel configuration Cfg-E 608 to permit transmissions by the UE in the upper MSS band 410 (2170-2200 MHz).

Figure 6:
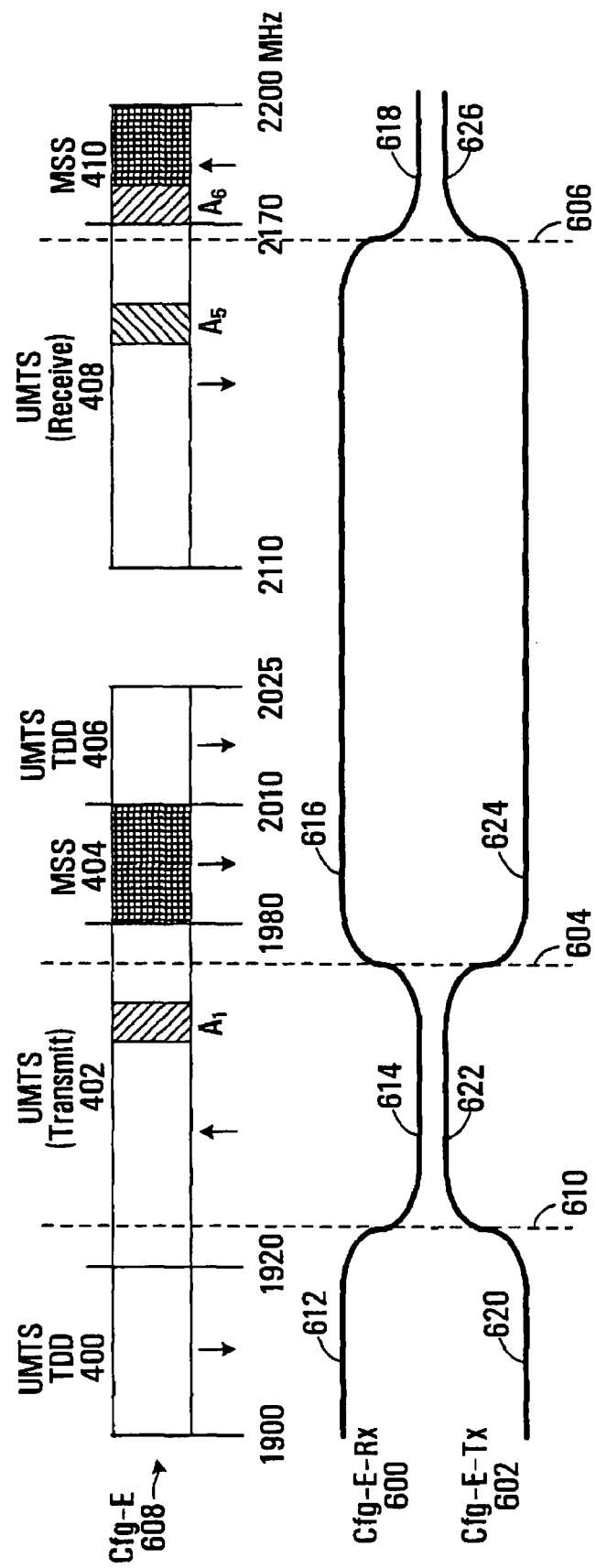
FIG. 6 is a chart of a radio spectrum assignment in the IMT-2000 mobile band, including Mobile Satellite Service bands, showing a third channel configuration and a third corresponding adaptive filter configuration in accordance with an embodiment of the invention.

In the example channel configuration Cfg-E 608 shown in FIG. 6, the UE has a UMTS service channel $A_1$ located in the UMTS transmit band 402 away from the edge of the UMTS transmit band 402. Similar to the frequency responses Cfg-D-Rx 506 and Cfg-D-Tx 508 for the example channel configuration Cfg-D 514, in order to accommodate transmission on the UMTS service channel $A_1$ and allow reception in the UMTS TDD band 400, the MSS band 404, the UMTS TDD band 406 and the UMTS receive band 408, the UE adjusts its Rx filter to have the frequency response Cfg-E-Rx 600 and adjusts its Tx filter to have the frequency response Cfg-D-Tx 602 in order to have a transition band 610 in the UMTS transmit band 402 above 1920 MHz and a transition band 604 in the UMTS transmit band 402 below 1980 MHz for the example channel configuration Cfg-E 608. In this configuration, the adjustable Rx filter and the adjustable Tx filter have a passband 612 and a stopband 620, respectively, below the transition band 610 and a stopband 614 and a passband 622, respectively, above the stopband 610 and below the transition band 604. Similar to the UMTS service channel $A_3$ in example channel configuration Cfg-D 514, the example channel configuration Cfg-E 608 also includes a UMTS service channel $A_5$ in the UMTS receive band 408. However, unlike the example channel configuration Cfg-D 514, which used the MSS band 410 only for reception, the example channel configuration Cfg-E 608 includes transmission on an MSS service channel $A_6$ that is located at the lower edge of the MSS band 410. Therefore, in order to accommodate reception on UMTS service channel $A_5$ and transmission on MSS service channel $A_6$, the Rx filter frequency response Cfg-E-Rx 600 and the Tx filter frequency response Cfg-E-Tx 602 have an additional transition band 606 in the UMTS receive band 408 below 2170 MHz. Therefore, the adjustable Rx filter and the adjustable Tx filter have a passband 616 and a stopband 624, respectively, between the transition band 604 and the transition band 606 and have a stopband 618 and a passband 626, respectively, above the transition band 606.

The channel configurations Cfg-C 512, Cfg-D 514, Cfg-E 608 and the filter frequency responses Cfg-C-Rx 500, Cfg-C-Tx 502, Cfg-D-Rx 506, Cfg-D-Tx 508, Cfg-E-Rx 600, Cfg-E-Tx 602 shown in FIGS. 5 and 6 are examples, Other channel configurations and other filter frequency responses could also be applied to permit transmit/receive operation on any of the UMTS bands 400, 402, 406, 408 and any of the MSS bands 404, 410.

In some embodiments that include the use of MSS channels, the UE adjusts its filters based on the need to access channels in the various bands. Generally, the UE will power up and adapt its filters to accommodate the whole of the UMTS bands to allow it to search for any UMTS signals. As will be discussed later, a UE that has previously had successful communications with multiple channels may reuse the filter adaptations that were previously used.

In some embodiments, once the UMTS services are known, the channels for the services in the other bands, for example UMTS TDD and MSS, can be determined, either through communication via the UMTS network, or by pre-loaded settings. With the assignments in the other bands determined, the UE can readjust, if necessary, its adaptive filters to accommodate the other channels.

Through the use of the adaptive filter and the process for adapting its transition frequency, the UE is able to readily accommodate operations (transmissions and reception) in channels in adjacent bands.

From the foregoing, it is clear that a transceiver in accordance with an embodiment of the present invention is operable to adjust filter transition bands of at least one of its transmit and receive filters to suit the "open space" between the channel assignments of the operating configuration. For example, in FIG. 3 the filter transition band 304 is located between the receive channel $A_{R1}$ and the transmit channel $A_T$ in Cfg-A 100 and the filter transition band 306 is located between the receive channel $B_{R1}$ and the transmit channel $B_T$ in Cfg-B 102, thus allowing access to all channels in use for the configuration.

While the example embodiments described above with regard to FIGS. 1 to 6 relate to adjustable filter configurations to accommodate various channel configurations in the IMT-2000/UMTS mobile bands, including MSS bands, embodiments of the present invention are not limited to these particular spectrum assignments. In general, embodiments of the present invention are applicable to any spectrum assignment and are particularly beneficial in spectrum assignments that include adjacent or nearly adjacent functional blocks with different functionality, for example, a receive block adjacent to a transmit block.

In some embodiments, adaptive filters are used to better isolate systems in adjacent channels that are using different technologies such as modulation and channel bandwidth or using different timing of transmission and reception. For example, embodiments of the present invention could be used in multiple TDD or asynchronous systems, which are unsynchronised in time and may transmit and receive simultaneously, in order to isolate the systems and allow them to operate in adjacent channels.

A number of spectrum administrators are considering implementing flexible assignments of spectrum. These flexible, dynamic networks could include both mobile and fixed transceivers. Such dynamic networks have the advantage of many users sharing a larger pool of spectrum resources (channels), which is more efficient than assigning a separate channel to each user, as there are usually not enough channels to go around.

In some embodiments, the adaptive filters are used in flexible spectrum assignments that include bands of channels that are available for general use and are not pre-assigned with transmit and receive sections and specific channels. Transceivers with adaptive filters could then be used by a group of nodes wanting to communicate to organise a suitable set of channels and transmission plans to suit the available channels and the user's needs. Some of the channels might be used by another group of nodes. This would be a form of "ad-hoc" or dynamic spectrum access networks with shared-channel block assignments. The adaptive channel filters in the transceivers not only enable the grouping of channels for transceivers into an ad-hoc network, but also enable terminals to access different ad-hoc groupings using different channel plans.

In some embodiments in a ad-hoc/dynamic spectrum access network, there is only one shared-channel block, and the problem is to share them for transmit and receive functions without any structure or channel plan within the block. In these embodiments, the aspects of embodiments of the present invention that relate to channels in adjacent blocks, are also applicable to adjacent, or nearby, channels in a block.

There are a number of ways to configure filters with an adjustable transition band. One way is to install multiple filters each with a transition band suitable for an anticipated spectrum configuration and operation. A switch is then operated by the transceiver controller to select the appropriate filter or combination of filters. While this configuration is a simple design, it suffers from the losses introduced by the switch used to select the appropriate filter or combination of filters. Such losses may reduce the transmitter's output power and degrade the receiver's sensitivity.

In some embodiments, a filter that has its tuning elements switched under the control of a transceiver controller to select the appropriate filter transition band is used. This configuration does not introduce an additional loss in the critical radio frequency (RF) signal paths of the transceiver, but it is more complex in that multiple switches and voltages may be required to adjust multiple tuning elements. In some cases tuning elements such as varactor diodes may be used that enable tuning by adjusting an applied control voltage. Such voltages would also be under the control of the transceiver controller to select the appropriate tuning.

Figure 7:
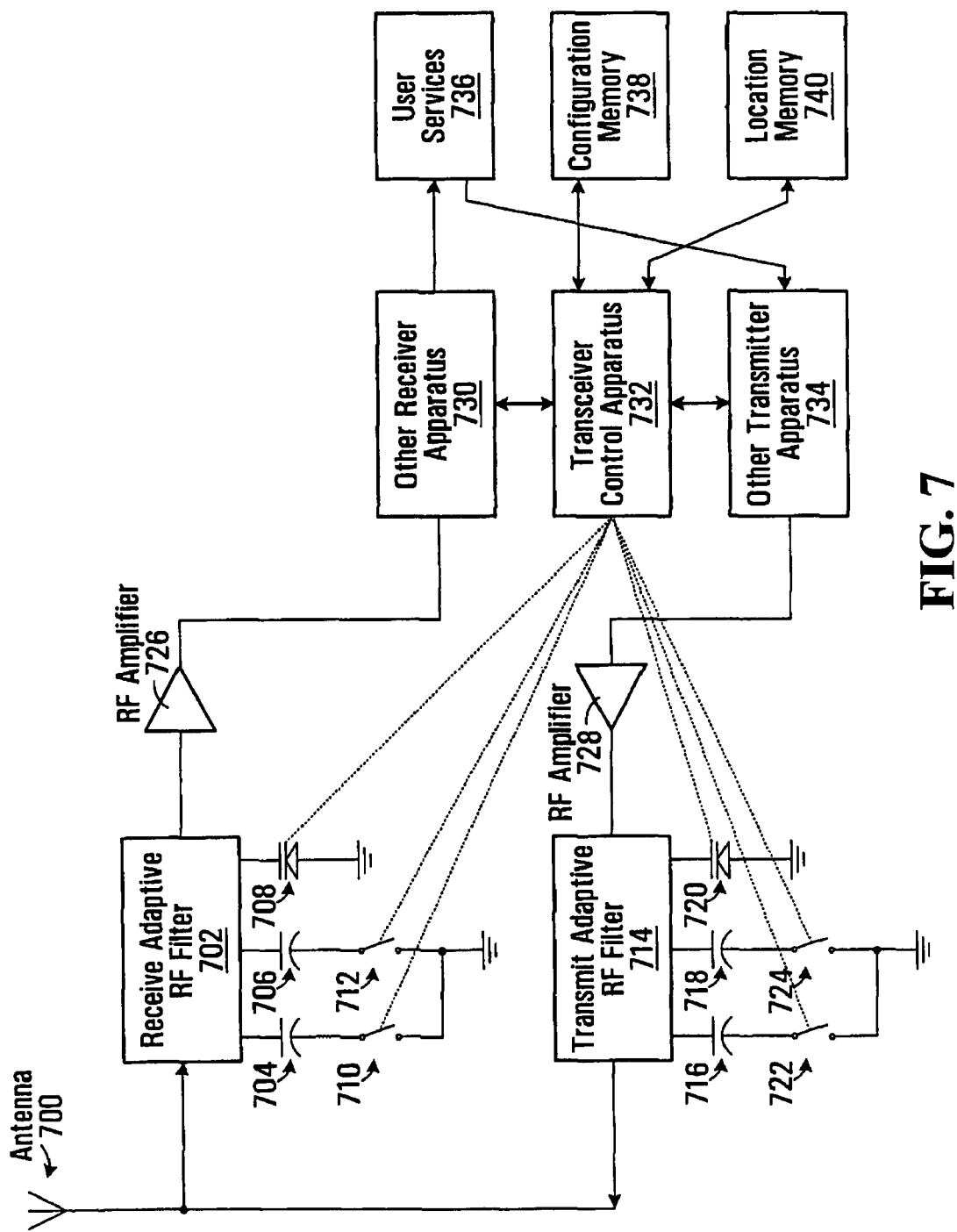
FIG. 7 is a block diagram of a mobile transceiver including an adaptive filter apparatus in accordance with an embodiment of the invention.

A wireless transceiver in accordance with an embodiment of the present invention will now be described with reference to FIG. 7. FIG. 7 is a block diagram of a wireless transceiver that includes an adaptive filter apparatus according to an embodiment of the present invention. The wireless transceiver is a single inexpensive transceiver that can be used for a plurality of channel configurations, for example, the channel configurations Cfg-A 100 and Cfg-B 102 shown in FIG. 1, and that can automatically detect and switch between the various possible channel configurations. In the wireless transceiver shown in FIG. 7, an antenna 700 is functionally connected to an input of a receive adaptive RF filter 702 and to an output of a transmit adaptive RF filter 714.

The receive adaptive RF filter 702 is functionally connected to a first terminal on each of three tuning elements: a first fixed capacitor 704, a second fixed capacitor 706 and a first varactor diode 708. The first fixed capacitor 704 and the second fixed capacitor 706 each have second terminals that are selectively coupled to a ground voltage through a first switch 710 and a second switch 712 respectively. The first varactor diode 708 has a second terminal that is connected to the ground voltage.

An output of the receive adaptive RF filter 702 is functionally connected to the input of a first RF amplifier 726. An output of the first RF amplifier 726 is functionally connected to an other receiver apparatus block 730.

The transmit adaptive RF filter 714 is also functionally connected to a first terminal on each of three tuning elements: a third fixed capacitor 716, a fourth fixed capacitor 718 and a second varactor diode 720. The third fixed capacitor 716 and the fourth fixed capacitor 718 each have second terminals that are selectively coupled to the ground voltage through a third switch 722 and a fourth switch 724 respectively. The second varactor diode 720 has a second terminal that is connected to the ground voltage.

An input of the transmit adaptive RF filter 714 is functionally connected to the output of a second RF amplifier 728. An output of the second RF amplifier 728 is functionally connected to an other transmitter apparatus block 734.

The other receiver apparatus block 730 and the other transmitter apparatus block 734 are each functionally connected to a transceiver control apparatus block 732 and to a user services block 736. The transceiver control apparatus block 732 is also functionally connected to a configuration memory block 738, a location memory block 740, and control inputs of: the first switch 710, the second switch 712, the first varactor diode 708, the third switch 722, the fourth switch 724 and the second varactor diode 720.

In operation, the tuning elements 704, 706 and 708 of the receive adaptive RF filter 702 and the tuning elements 716, 718 and 720 of the transmit adaptive RF filter 714 are controlled by the transceiver control apparatus block 732 to selectively place at least one transition band in order to separate the signal operations between two or more bands of spectrum. Opening or closing the switches 710, 712, 722 and 724 in order to add or remove the effect of the capacitors 704, 706, 716 and 718 and adjusting the capacitance of the varactor diodes 708 and 720 moves at least one transition band of the receive adaptive RF filter 702 and the transmit adaptive RF filter 714. The adaptive RF filters 702 and 714 may be adjusted to place their transition bands on either side of a boundary between adjacent or nearly adjacent spectrum blocks.

The arrangement of the tuning elements, i.e. the capacitors 704, 706, 716 and 718, the switches 710, 712, 722 and 724 and the varactor diodes 708 and 720, and their interconnection between the adaptive RF filter blocks 702 and 714 and the ground voltage are purely exemplary. The tuning elements and their connection as part of the adaptive RF filter blocks 702 and 714 are an implementation specific detail. In general, filter tuning elements may be arranged in any manner that allows for the adjustment of a transition frequency of one or more transition bands of a filter to suit spectrum block operating assignments. There may be more or fewer switched capacitors or varactor diodes used than illustrated. The switches 710, 712, 722, 724 may be electronically controlled by the control apparatus 732.

While FIG. 7 includes both a receive adaptive RF filter 702 and a transmit adaptive RF filter 714, in general, an adaptive RF filter is provided in at least one of the transmitter section and the receiver section of a transceiver.

In FIG. 7, the adaptive RF filters 702 and 714 are shown as being tuned (to adjust the at least one transition band) by a combination including at least one of switched capacitors and varactor diodes. In general, any type and number of adjustable tuning element may be used.

The adaptive filter control function of the transceiver control apparatus block 732 may most economically be performed as an additional function of the control processor that is already part of the transceiver for other purposes. In this case, the control processor is augmented to include the needed control signals to operate the tuning apparatus functions of the adaptive RF filters 702 and 714. A control processor is generally in operation as part of the User Services block 736.

The user services block co-ordinates with the other receiver apparatus block 730 and the other transmitter apparatus block 734 to carry out the reception and transmission of data related to user services.

The other receiver apparatus block 730 and the other transmitter apparatus block 734 co-ordinate with the transceiver control apparatus block 732 to ensure that the adaptive RF filters 702 and 714 are tuned according to the appropriate channel configuration for the desired user services.

The RF amplifier 726 amplifies received signals that have been received by the antenna 700 and filtered by the receive adaptive RF filter and passes these now filtered and amplified receive signals to the other receiver apparatus block 730. The RF amplifier 728 amplifies transmit signals generated by the other transmitter apparatus 734 and passes these amplified transmit signals on to the transmit adaptive RF filter 714 for filtering and then transmission via antenna 700. Although, the RF amplifiers 726 is shown as being separate from the other receiver apparatus block 730 and the RF amplifier 728 is shown as being separate from the other transmitter apparatus block, RF amplifiers 726 and 728 are standard functional blocks of most wireless transceivers and may be considered to be part of the other receiver apparatus block 730 and the other transmitter apparatus block 734 respectively.

In some embodiments, the transceiver is informed of the channel configuration in use by signaling information sent from a network transmitter. In some embodiments, the transceiver also makes use of channel configuration information pre-programmed into its operating procedures.

In some embodiments, for a spectrum assignment with one or more main functional blocks and one or more auxiliary functional blocks, such as the main functional blocks $S_R$ 110 and $S_T$ 106 and the auxiliary functional block $T_{R1}$ 104 of the spectrum assignment shown in FIG. 3, and for a channel configuration such as that of Cfg-A 100, the transceiver control apparatus block 732 initially sets the adaptive RF filters 702 and 714 to include the whole of the blocks $S_R$ 110 and $S_T$ 106. Once the desired operator's channel had been found and the signaling decoded, information about the location of the auxiliary channel $A_{R1}$ in block $T_{R1}$ 104 is determined to be available, and the transition bands of the adaptive RF filters 702 and 714 are adjusted to lie between the active channels, i.e. between $A_{R1}$ and $A_T$ and between $A_T$ and $A_{R2}$ for the channel configuration Cfg-A 100 shown in FIG. 3.

As an alternative to first receiving information from the network about the channels, the transceiver could also make use of pre-programmed initial configurations or reuse the configuration that it used the last time it was operated. This previous operation may include information as to the location (position) it was last used. The transceiver may determine its location by one of a number of known methods including the use of a GPS receiver or from other sources. The channel and filter configuration would be adjusted to suit the previously known settings for that location and service. The previous operation and location of the transceiver are stored in the configuration memory block 738 and the location memory block 740 of the transceiver shown in FIG. 7 respectively.

The configuration memory block 738 stores filter parameters for controlling the varactor diodes 708 and 720 and the switches 710, 712, 722 and 724 of the adaptive RF filters 702 and 714 for various spectrum block configurations. The configuration memory 738 may also be used to store the spectrum block configuration used at the last location that may be reused as initial setting when restarting the channel access at a later time.

The location memory block 740 stores the location of the transceiver and the required filter parameters for spectrum configurations in various locations. A location determining apparatus (e.g. a GPS receiver and processor—not shown) may also be part of the transceiver to determine the location of the transceiver. Alternatively the transceiver may receive information about its location from a location service that is part of the network. Other parts of the transceiver that are associated with normal transmission and reception of signals and services are not illustrated but are considered part of the other receiver apparatus block 730 and/or the other transmitter apparatus block 734.

The selection of filter parameters based on specific operating conditions is an implementation specific detail. In some embodiments, the location memory 740 and the configuration memory 738 sections may both contain filter configurations and the control apparatus 732 could retrieve filter parameters based on location from the location memory 740 and based on channel or history conditions from the configuration memory 738.

In some embodiments, the configuration memory 738 stores filter parameters for an expected set of channel configurations, for example, the channel configurations Cfg-A 100, Cfg-B 102, Cfg-C 512, Cfg-D 514, Cfg-E 608 shown in FIGS. 1-3, 5 and 6. The control apparatus 732 could, in some embodiments, then determine a channel configuration based on location from the location memory 740 (i.e. Cfg-B is used at specific latitude/longitude), or from channel usage or history of what was last used. With the channel configuration selected based on a number of conditions, the filter parameters for the selected channel configuration could be looked up in the configuration memory 738.

In the event that the transceiver moves to a location where an alternative block configuration is in use, the transceiver would adjust its filter transition band to suit the new conditions. Such reconfiguration could also be as a result of other reasons for changing channels, including channel assignment changes requested by the network to balance its traffic load, or for changes in desired reception of programme material by the user.

To facilitate the rapid and smooth handover of services between different network configurations the signaling requesting the handover would include the necessary information for operation on the new channels, including the needed adjustment of the filter transition band or information to permit the new configuration to be easily determined by the transceiver. As an alternative to receiving information from the network for configuration of the new channels, the transceiver could also make use of pre-stored information or information about the last configuration at the new location that is stored in the location memory block 740.

In the event that the new configuration of the channels involves use of at least one edge channel between different operating blocks, the transceiver would first receive the new channel configuration information, determine the filter parameters for the new channel configuration, then adjust the transition bands of the adaptive RF filters 702 and 714 according to the determined filter parameters and then begin use of the new channels. That is: the transceiver would first determine the new configuration for the adaptive RF filters 702 and 714, then pause its transmitter/receiver operations, adjust the transition bands of the adaptive RF filters 702 and 714, retune its transmitter/receivers to the newly assigned channels and finally resume transceiver operation. This sequence of stages assures the minimum of disruption to the service and assures that signals are not unnecessarily lost through maladjusted filters or radio circuits.

In some embodiments, the configuration memory 738 contains the filter parameters that are to be used for the new channel configuration and the control apparatus 732 will retrieve the filter parameters from the configuration memory 738 once the new channel configuration information is received. In some cases, the filter parameters for predetermined channel configurations are stored in the configuration memory at the time of manufacture of the transceiver as part of calibration or design.

In the unlikely event that a channel configuration required the use of adjacent edge channels in adjacent operating blocks with different operations, and hence one or the other of the adjacent edge channels would be blocked by the transition band of the adaptive RF filters 702 and 714, the transceiver would select the filter transition band to permit the use of the channel providing the service requested by the user. This selection would be changed as needed if the user selected another service requiring a different channel configuration. For example, in some embodiments, if the transceiver must choose between two adjacent edge channels, the transceiver will select the edge channel that permits a user requested service, i.e. if a user service requires transmission, transition bands of the adaptive RF filters 702, 714 will be placed to allow operation on the adjacent edge channel that allows transmission for the user requested service. Note that even if the user selects services that may seem to require the use of both adjacent edge channels, in some embodiments, the adaptive filters 702, 714 may be switched back and forth in time to enable both channels to be accessed alternatively, but not at the same time. This alternate operation provides "virtual" (time-shared) access to both adjacent edge channels and so permits both services to be enabled.

While the configuration memory block 738 and the location memory block 740 are shown as separate block in FIG. 7, in some embodiments they may be incorporated in a single memory block shared across a control processor of a transceiver.

In some embodiments, the transceiver control apparatus block 732, the user services block 736, the configuration memory block 738 and the location memory block 740 are implemented as an application specific integrated circuit (ASIC) or a logic device such as a field programmable gate array (FPGA) or a programmable logic device (PLD). In general, they might be implemented as hardware, software, firmware or combinations thereof.

Figure 8:
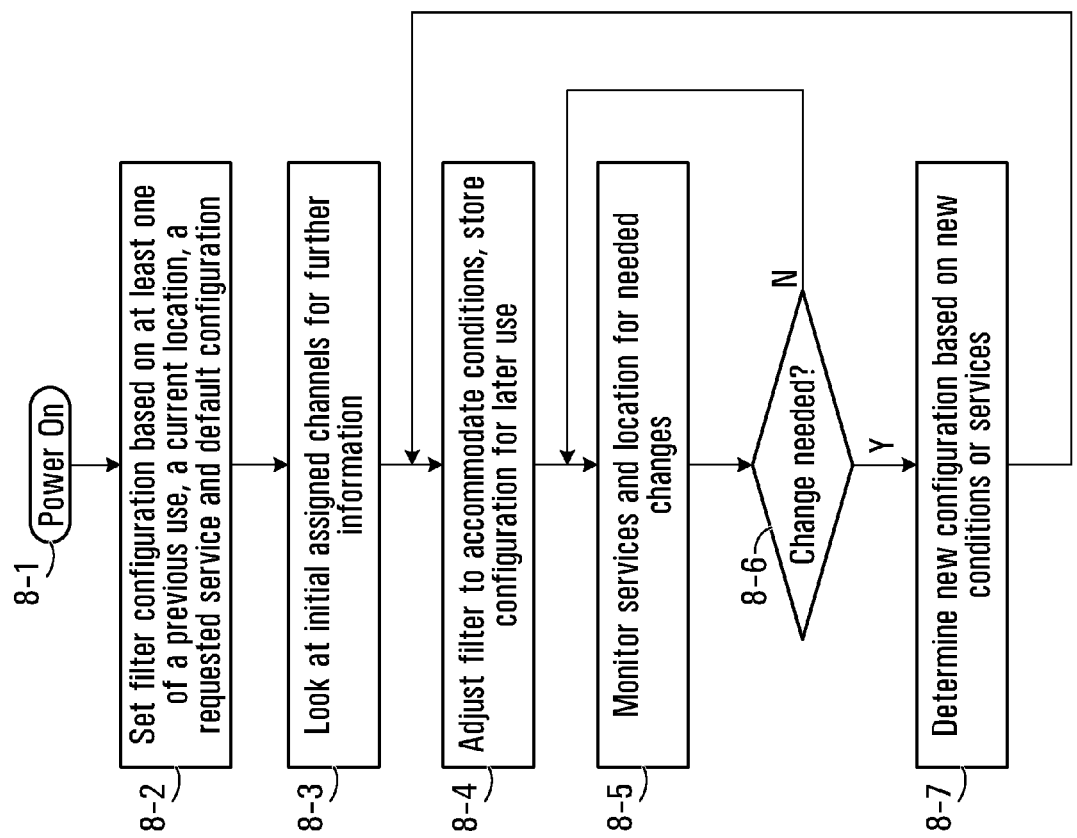
FIG. 8 is a flowchart of a method for initializing and adapting an adaptive filter apparatus in response to changes in conditions and usage in accordance with an embodiment of the invention.

An example of a method for initially setting an adaptive filter configuration in a wireless transceiver, for monitoring the conditions and services and for revising the adaptive filter configuration will now be described with reference to FIG. 8. FIG. 8 is a flow chart of an example of a method in accordance with an embodiment of the present invention. The method might, for example, be executed in the transceiver control apparatus block 732 of the wireless transceiver shown in FIG. 7. The method begins at step 8-1 when the transceiver is powered on. In step 8-2 the adaptive filter is configured based on at least one of a previous use, a current location, a requested service and a default configuration. In step 8-3, the transceiver looks at initial assigned channels for further information regarding channel conditions. In step 8-4, the adaptive filter is adjusted to accommodate the channel conditions and the adjusted filter configuration is stored for later use, such as the next time the transceiver is powered on after being turned off. In step 8-5, the services and location are monitored in order to determine if changes to the filter configuration are needed. In step 8-6, upon determining that no change is needed, the method returns to step 8-5 (the No path). Alternatively, in step 8-6, upon determining that change is needed, the method proceeds to step 8-7 (the Yes path). In step 8-7, a new filter configuration is determined based on new conditions or services and the method returns to step 8-4.

The method illustrated in the flowchart of FIG. 8 is merely exemplary. The steps of the method may be re-ordered and/or steps may be added or removed.

In some embodiments, the filter configuration is stored along with a record of the current location in step 8-4.

In some embodiments, in step 8-4, the transceiver pauses its transmitter/receiver operations, adjusts the filter configuration and then re-tunes its transmitter/receiver to accommodate the new channel conditions.

In some embodiments, a new filter configuration is determined in step 8-7 based on new local conditions of use such as a handover to a new network access point or a change of channel assignment as a result of load balancing or a change of service request.

In accordance with embodiments of the invention various forward link control channel schemes are described. Though the broader inventions are not limited in this regard, embodiments of the invention could be used in accordance with various wireless standards including 3GPP LTE, 3PGG2 AIE and IEEE 802.16. Although embodiments are described in the context of an OFDMA air interface, the broader inventions are applicable to CDMA and other air interfaces.

For purposes of providing context for the embodiments of the invention described below, the following is as set of examples of what might constitute forward link (FL) control information:

system information such as operator and BS (sector) specific information—this might for example include operator information, BSID, geography info, subnet ID, channels, etc.;

system configuration such as system-wide and BS (sector)-wide operation configurations—this might for example include the number of active mobiles, access information, etc.;

neighbor information and configuration such as key system information and configuration information of neighbor BS (sector);

access acknowledgement used to acknowledge the detection of random access of mobiles—this may involve the assignment of an ID (temporary or active) for further access procedures;

page messages such as pages used to page idle mobiles;

power control signaling, for example to signal power control info for RL transmission;

H-ARQ Ack signaling such as ACK/NACK information to enable RL H-ARQ operation. In some implementations this is not used when there is a RL hybrid H-ARQ scheme implemented since the ACK/NACK could be absorbed in assignment block by using an ACK/NACK echo method; and resource assignment, this being signaling to provide resource assignment description.

For purposes of providing further context FIG. 9 provides various properties for the various FL control information types described above.

Three factors considered for purposes of an embodiment of the invention were:

Minimization of control signaling overhead
    Avoid using fixed resource
    Small resource granularity may be used
MS power saving
    Enable independent transmission (decode) of different type of control information
    Enable easy system information and configuration info acquisition (forecast or fixed) by initial and idle MSs
Traffic amount transmission balance
    Avoid insufficient resource for retransmission if synchronized or hybrid H-ARQ is supported
    Large control information amount (e.g., system info, system configuration, neighbor info/config) may be transmitted through multiple slots/frames and may be upper bound for the transmission of information amount According to a first broad embodiment of the invention a forward link control channel scheme where each type of control information block transmitted by corresponding physical channel According to an embodiment of the invention a physical channel may be defined as follows:

Guide Channel (GCh)
    Carries guidance information regarding how to locate a physical control channel without using an intermediate step such as a MAP as set out in the IEEE 802.16 (e) standard
System Information channel (SICh)
    Carries system information block
System configuration channel (SCCh)
    Carries system configuration block (number of active mobiles, PC block size, access information, etc)
Neighbor Information channel (NICh)
    Carries Neighbor Information block
Access Ack channel (AACh)
    Carries access acknowledgment block
Page channel (PCh)
    Carries page block
Power control channel (PCCh)
    Carriers Power Control block to RL interference
H-ARQ Ack channel (HACh)
    Carries H-ARQ Ack block for RL H-ARQ operation
    (may not be required if RL hybrid H-ARQ scheme implemented since the ack/nack could be absorbed in assignment block by using ack/nack echo method.)
Assignment-1,2,3 channels (ASCh1,2,3)
    Carry resource assignment blocks
    Three assignment channels use three different MCS to serve three groups of mobiles with each group of mobiles having the similar channel condition. Note, however, that any number of assignment channels could be used.

The guide channel includes information to allow a user element to acquire control information. According to this embodiment there may be N types of control block for the N types of control information and N pointers. As one of ordinary skill in the art will appreciate not every type of control channel needs to be included in a frame. Accordingly a pointer for each type of control channel is not needed in each GCh.

In accordance with this first broad embodiment of the invention FIG. 10 presents a mapping of control information blocks on physical channels.

Regarding the Guide channel specifically:
Enables variable-sized FL control block design
Enables terminal power saving
Guide channel may be introduced in every frame
    May be used to transmit Guide Block
    Guide Block may be used to indicate the resource occupied by each present control channel (size and location)
Guide channel transmission
    Location: may be transmitted in the first OFDM symbol pairs following preamble
    Size: may depend on bandwidth
    The modulation, coding rate and repetition may be pre-defined and well known
    May use most robust transmission scheme, though not a requirement—typically the most robust use to ensure de-coding is successfully be edge users
    May use diversity channel used, though sub-bands could also be used. In general, a diversity channel is not as susceptible to interference.

Figure 12:
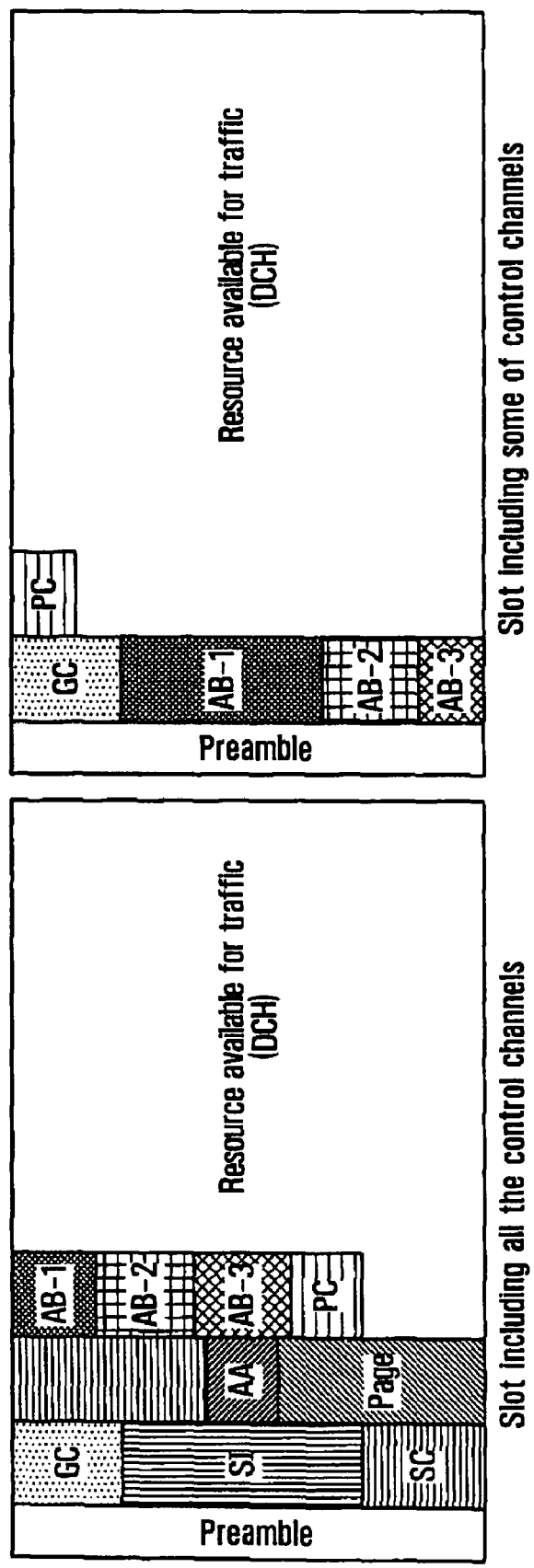
FIG. 12 is a block diagram of two example forward link control channel transmissions in accordance with an embodiment of the present invention.

In accordance with this first broad embodiment of the invention FIG. 11 presents a Guide Block Information format:

Size of anchor block
    6 bytes, 7 bytes, 8 bytes and 9 bytes for 5 MHz, 10 MHz, 15 MHz and 20 MHz bandwidth In accordance with this first broad embodiment of the invention, FIG. 12 presents two example FL control channel transmissions.

In accordance with this first broad embodiment of the invention operation of a base station may be provided by the following:
- BS may transmit the Guide channel every slot (scheduling interval)>
- BS may transmit System Information channel periodically (e.g. every 500 ms on the superframe i (mod(i, 50)=0))
- BS may transmit System Configuration channel whenever the configuration needs to be updated
  - When the System Configuration channel is present in a slot, the Guide channel may indicate the size of it
  - When the System Configuration channel isn't present, the Guide channel may indicate the count of the current system configuration block and may forecast the next transmission of System Configuration channel and may flag a new configuration
- BS may transmit Neighbor Information channel periodically.
  - When the Neighbor Information channel is present in a slot, the Guide channel may indicate the size of it
  - When the Neighbor Information channel isn't present, the Guide channel may indicate the count of the current Neighbor Information block and forecast the next transmission of Neighbor Information channel and may flag a new Neighbor Information block
- BS may transmit the Access Ack channel whenever any access code transmission is detected
- BS may transmit the Page Channel whenever any mobile in idle mode needs to be paged
- BS may transmit the Power Control channel every slot
  - The size may be slowly changed based on the number of active mobiles
- BS may transmit ARQACK channel every frame
- BS may transmits at least one of ASCh1,2,3 every slot In accordance with this first broad embodiment of the invention an initial access approach for a user element may be provided by the following:
- Synchronization phase
  - Mobile may synchronize with the frame/slot through physical process (common synch, preamble process)
  - Mobile may decode Guide block and understand the current superframe number and next transmission superframe of System Configuration block
  - Mobile may decode the System Information block at superframe i (mod(i,50)=0) and may decode only the SICh in that slot
  - Mobile may decode the System Configuration block at the slot based on the forecast in Guide block and may decode only the SCCh in that slot
  - Mobile may decode the Neighbor Information block at the slot based on the forecast in Guide block and may decode only the NICh in that slot
- Access phase
  - Mobile may transmit access code and monitors Access Ack channel
  - Mobile may obtain the assignment of RL resource and ID assignment from AACh for further access process In accordance with this first broad embodiment of the invention an idle mode approach for a user element may be provided by the following:
- Mobile may wake up to monitor the Guide channel during its paging window
  - To check whether it is paged
    - If the mobile is paged, the mobile may obtain an ID from PG block and continue the transition procedure
  - To obtain current System Configuration block count and to obtain System Configuration block transmission forecast and current/new indication
    - If the current/new bit indicates a new System Configuration block, the mobile may wake up when the System Configuration block is transmitted if it is in idle mode at that time
    - If the current/new bit indicates a current System Configuration block, the mobile may not wake up at System Configuration block transmission time if it is in idle mode at that time
  - To obtain current Neighbor Information block count and to obtain Neighbor Information block transmission forecast and current/new indication
    - If the current/new bit indicates a new Neighbor Information block, the mobile may wake up when the Neighbor Information block is transmitted if it is in idle mode at that time
    - If the current/new bit indicates a current Neighbor Information block, the mobile may not wake up at Neighbor Information block transmission time if it is in idle mode that time In accordance with this first broad embodiment of the invention an active mode approach for a user element may be provided by the following:
- Mobile may decodes System Information block, System Configuration block and Neighbor Information block based on the guidance of Guide channel
- Mobile may decode Power Control channel (the size of PC channel is indicated in System Configuration block and may be the last control channel)
- Mobile may decode assignment channels, and check its resource allocation. If no action needs to be taken (receiving/transmitting), the mobile stops further process in this slot (scheduling interval)

In accordance with this second broad embodiment of the invention an approach to forward link control channels may involve having control information for user elements requiring the same modulation and coding to be put into the same control channel. According to an embodiment, those requiring the most robust modulation and coding are grouped together for control channel purposes.

According another embodiment relating to the second broad embodiment, physical control channels used in this approach may include a guide channel, a common control channel (CCCh), and an Assignment channel e.g. (ASCH 1,2,3 . . . ). Note that the assignment channel need not be present in each frame, i.e. if there is no uni-cast data being sent in the frame.

In accordance with an embodiment of the invention relating to the second broad embodiment FIG. 13 presents a mapping of control information block on physical channels where mobiles having the same modulation and coding being grouped in a common control channel.

Figure 14:
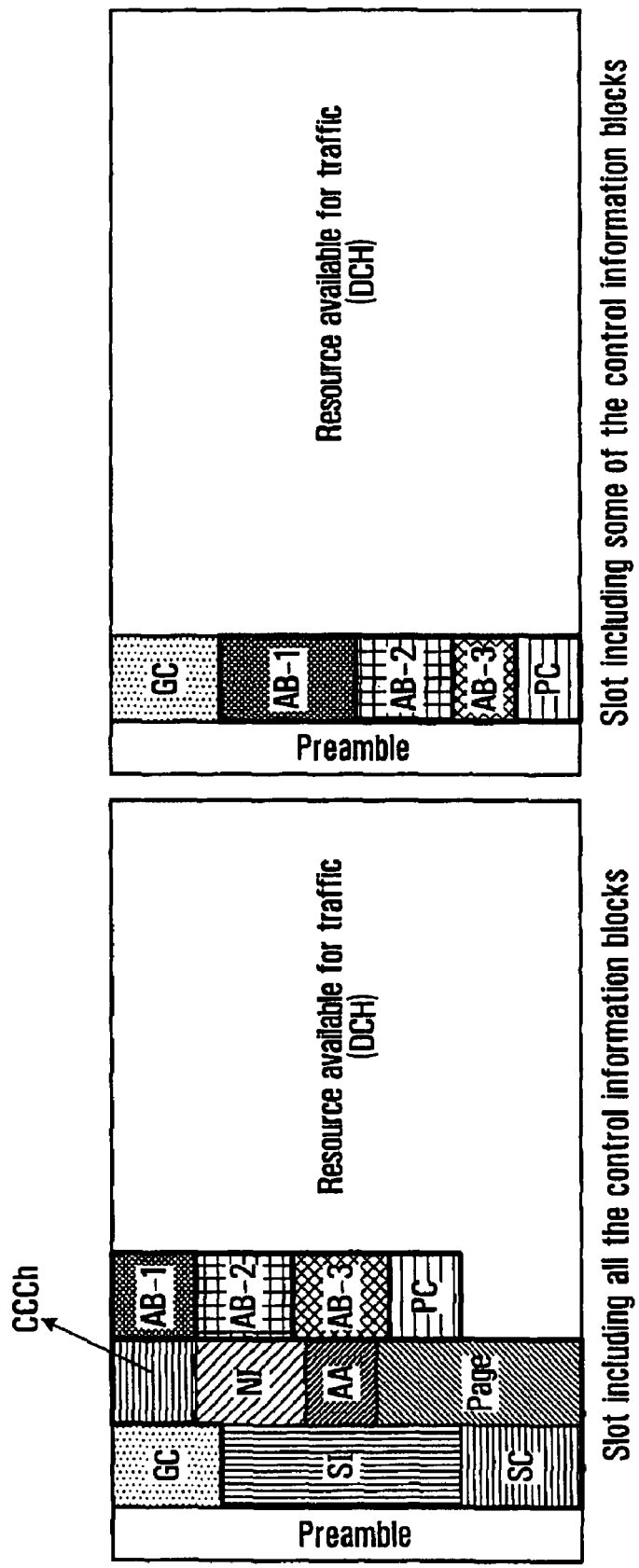
FIG. 14 is a block diagram of two examples of forward link control channel transmissions in accordance with an embodiment of the present invention.

In accordance with an embodiment of the invention relating to the second broad embodiment FIG. 14 presents examples of FL control channel transmissions.

In accordance with an embodiment of the invention relating to the second broad embodiment an initial access scheme for a user element may be provided by the following:
- Synchronization phase
  - Mobile may synchronize with the frame/slot through physical process (common synch, preamble process)

Based on the Guide information block user element may decide whether to decode the CCCh to obtain System information, system configuration information Access phase Based on Guide information block, the user element may decide whether to decode the CCCH and to check the access acknowledgment block Mobile may obtain the assignment of RL resource and ID assignment from AACh for further access process In accordance with an embodiment of the invention relating to the second broad embodiment an idle/active mode scheme for a user element may be provided by the following:

Idle mobile

Based on the Guide information block, mobile may decide whether to decode the CCCH to get synchronized to the system information, system configuration and check the Page block Active mobile Based on Guide information block user element may decide whether there is a need to decode CCCh to get updated System configuration information and Neighbor Information blocks May always decode Power Control Channel (the size if indicated in System Configuration block and the location in following the last Assignment channel)

Based on the Guide information block may decode Assignment block to check any resource assignment In accordance with this third broad embodiment of the invention an approach to forward link control channels may include control information for user elements in the same mode being put into the same control channel:

May group some control information blocks based on the targeted mobiles' modes

Control information blocks in each such a group may be put into a physical channel Physical control channels may include:

Guide channel

Common Control channel

Carries System information, System Configuration and Neighbor Information blocks May be monitored by all modes of mobiles Transition Control channel Carries Access Acknowledgment and Page blocks May be monitored by initial access and idle mode mobiles Power Control channel Carries the Power Control block May be monitored by only active mobiles Assignment channels Carries assignment blocks May be monitored by active mobiles and mode transitioning mobiles (initial access->active and idle->active)

In accordance with an embodiment of the invention relating to the third broad embodiment FIG. 15 presents a mapping of control information block on physical channels for user elements in the same mode. (See Access Acknowledgement and Paging control information block which depends on mode.)

Figure 16:
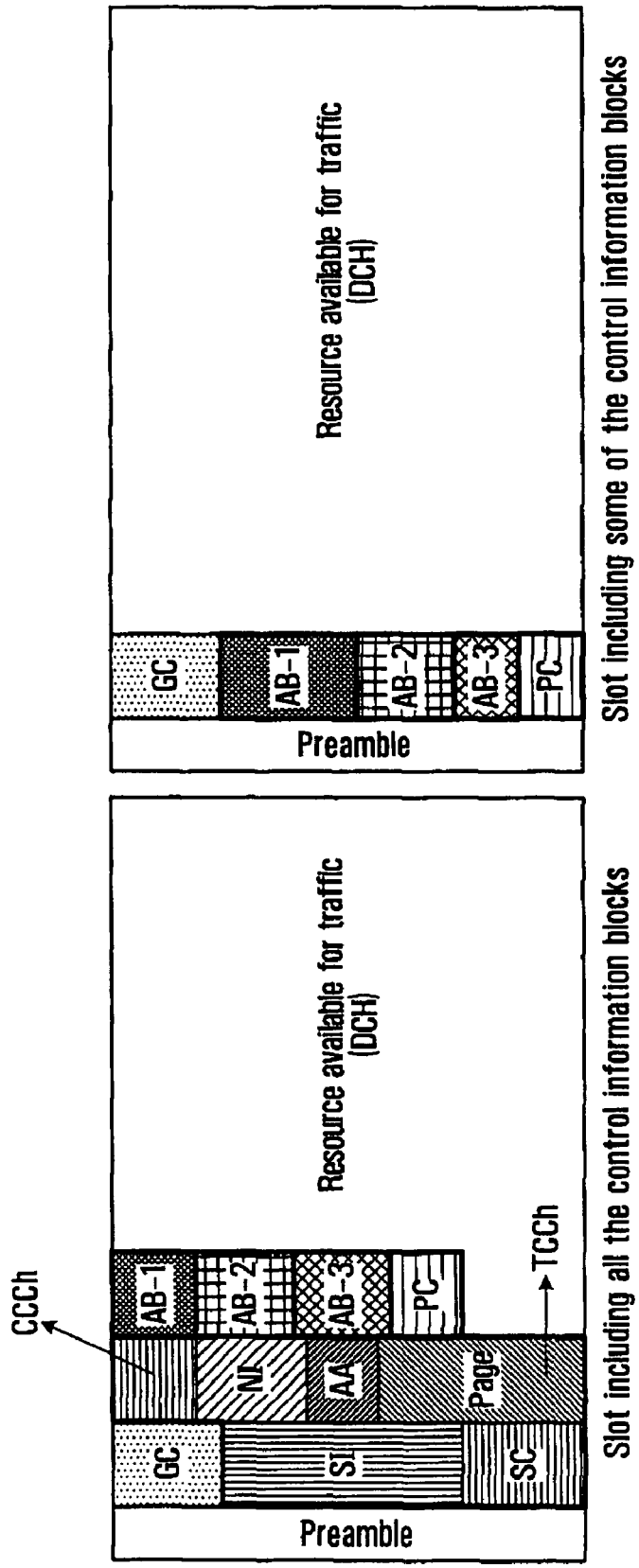
FIG. 16 is a block diagram of two examples of forward link control channel transmissions in accordance with an embodiment of the present invention.

In accordance with an embodiment of the invention relating to the third broad embodiment FIG. 16 presents examples of FL control channel transmissions.

In accordance with an embodiment of the invention relating to the third broad embodiment initial access procedures for user elements may be provided by the following:

Synchronization phase

Mobile may synchronize with the frame/slot through physical process (common synch, preamble process)

Based on the Guide information block user element may decide whether to decode the CCCh to obtain System information, system configuration information Access phase Based on Guide information block, the mobile may decide whether to decode the TCCh and to check the access acknowledgment block Mobile may obtain the assignment of RL resource and ID assignment from AACh for further access process In accordance with an embodiment of the invention relating to the third broad embodiment idle mode procedures for user elements may be provided by the following:

Based on the Guide information block user element may decide whether to decode the CCCh to obtain System information, system configuration information and Neighbor Information Based on the Guide information block user element may decide whether to decode Transitioning Control channel (TCCh) to check whether it is paged Idle mobile may obtain the ID and assignment from the Page block if it is paged In accordance with an embodiment of the invention relating to the third broad embodiment active mode procedures for user elements may be provided by the following:

Based on the Guide information block user element may decide whether to decode the CCCh to obtain System information, system configuration information and Neighbor Information May always decode Power Control Channel (the size if indicated in System Configuration block and the location in following the last Assignment channel)

Figure 17:
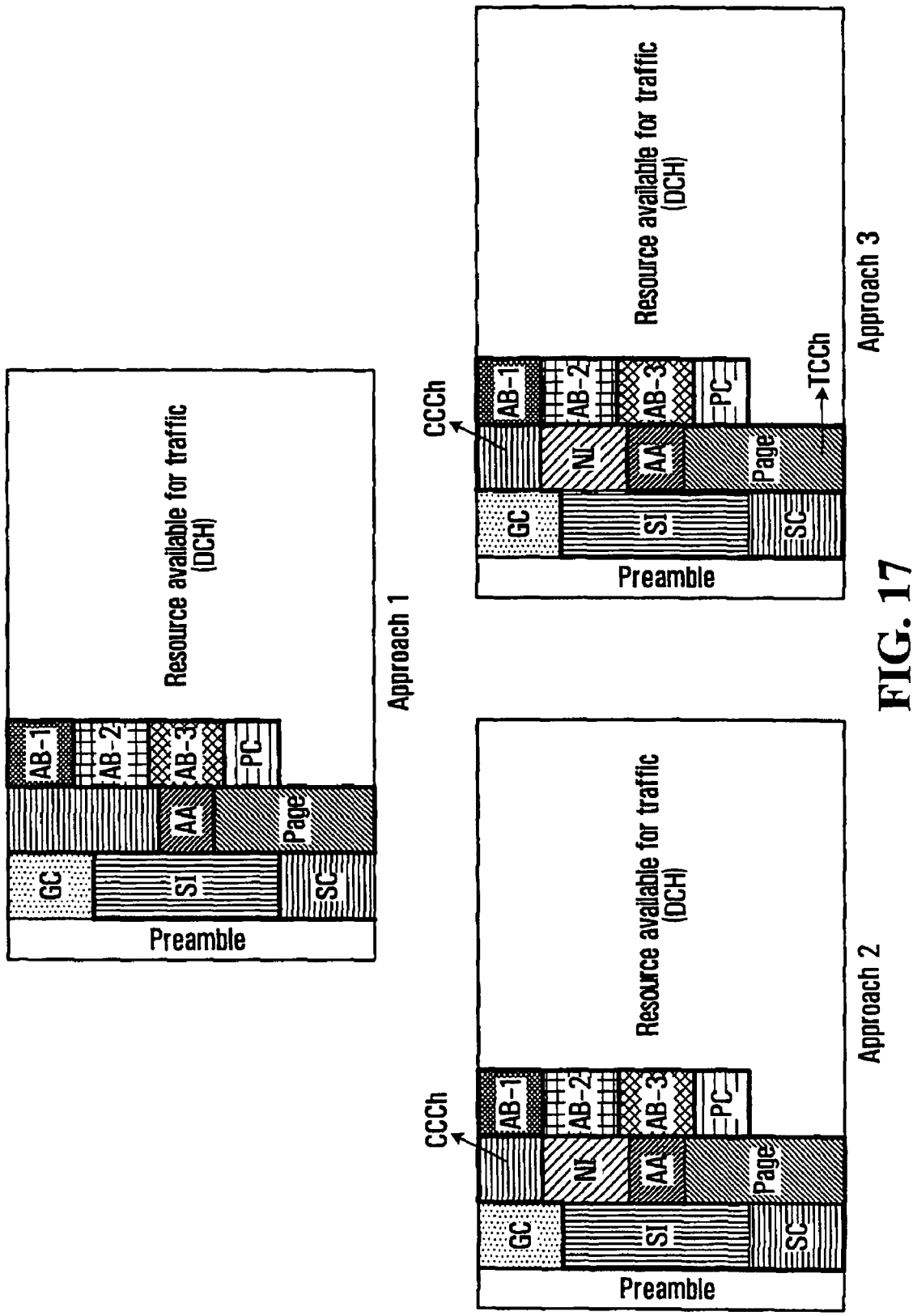
FIG. 17 is a block diagram of three examples of forward link control channel transmissions in accordance with an embodiment of the present invention.

Based on the Guide information block user element may decode Assignment block to check any resource assignment FIG. 17 presents an overview of the three approaches.

Approach 1

Most power efficient since mobile only needs to decode the wanted control channel based on the information provided by Guide channel Not the most overhead efficient since physical layer needs to add CRC and padding bits to fit the integer number of BAU (minimum resource)>

Approach 2

Most overhead efficient since physical layer can minimize the required CRC and padding bits Not the most power efficient since a mobile needs to decode the whole Common Control channel to obtain even one of carried information block Approach 3

Trade-off between those of approach 1 and 2

In accordance with another broad embodiment of the invention a dynamic approach can be used whereby based on user element characteristics or traffic characteristics a base station may dynamically switch approaches in order to realize the benefits of each.

Though the above embodiments are not limited in this regard, an OFDM based wireless access network which could be used to implement the above embodiments is described below.

Figure 18:
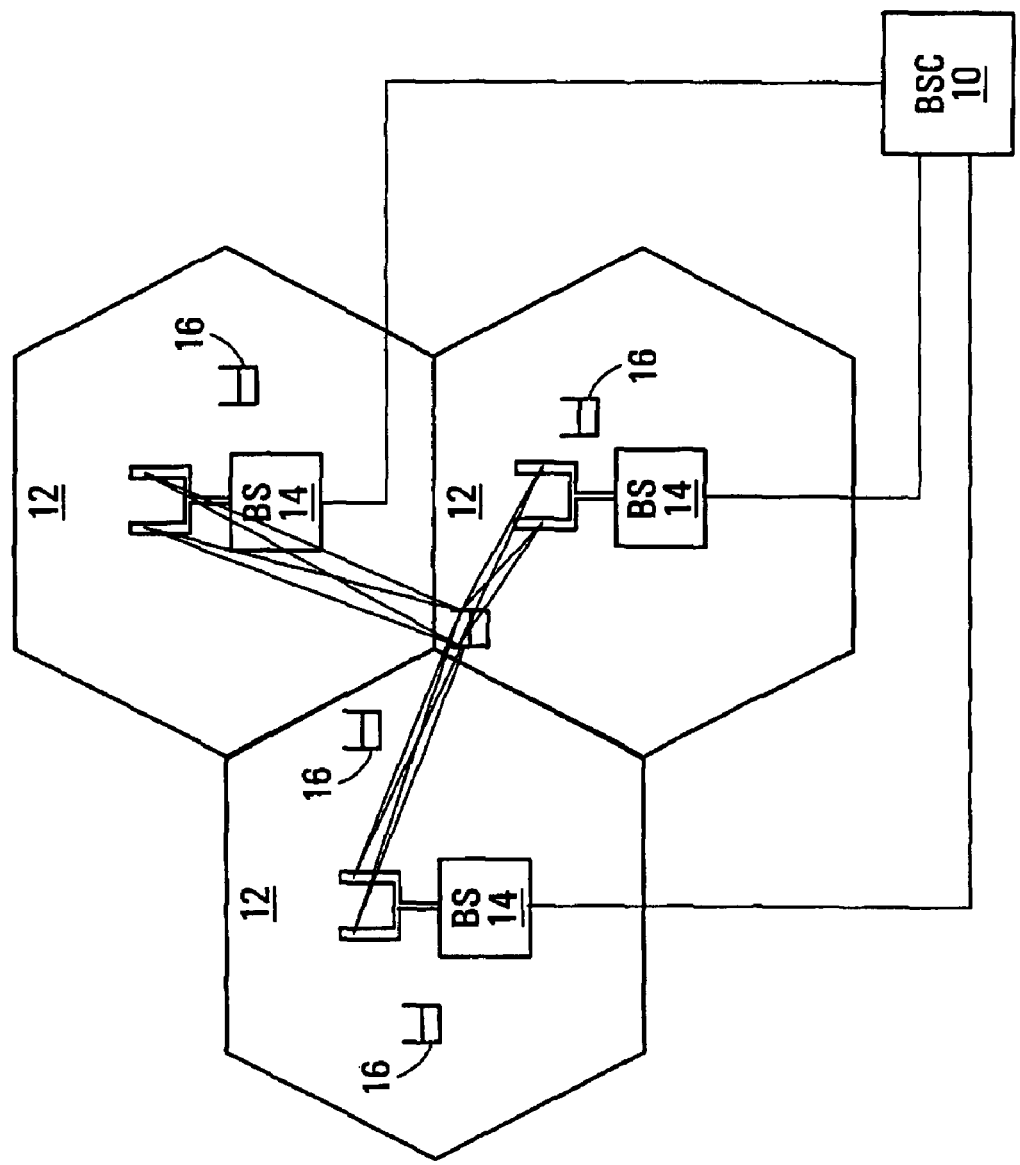
FIG. 18 is a block diagram of a cellular communication system.

With reference to FIG. 18, a base station controller (BSC) 10 controls wireless communications within multiple cells 12, which are served by corresponding base stations (BS) 14. In general, each base station 14 facilitates communications using OFDM with mobile terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications.

Figure 19:
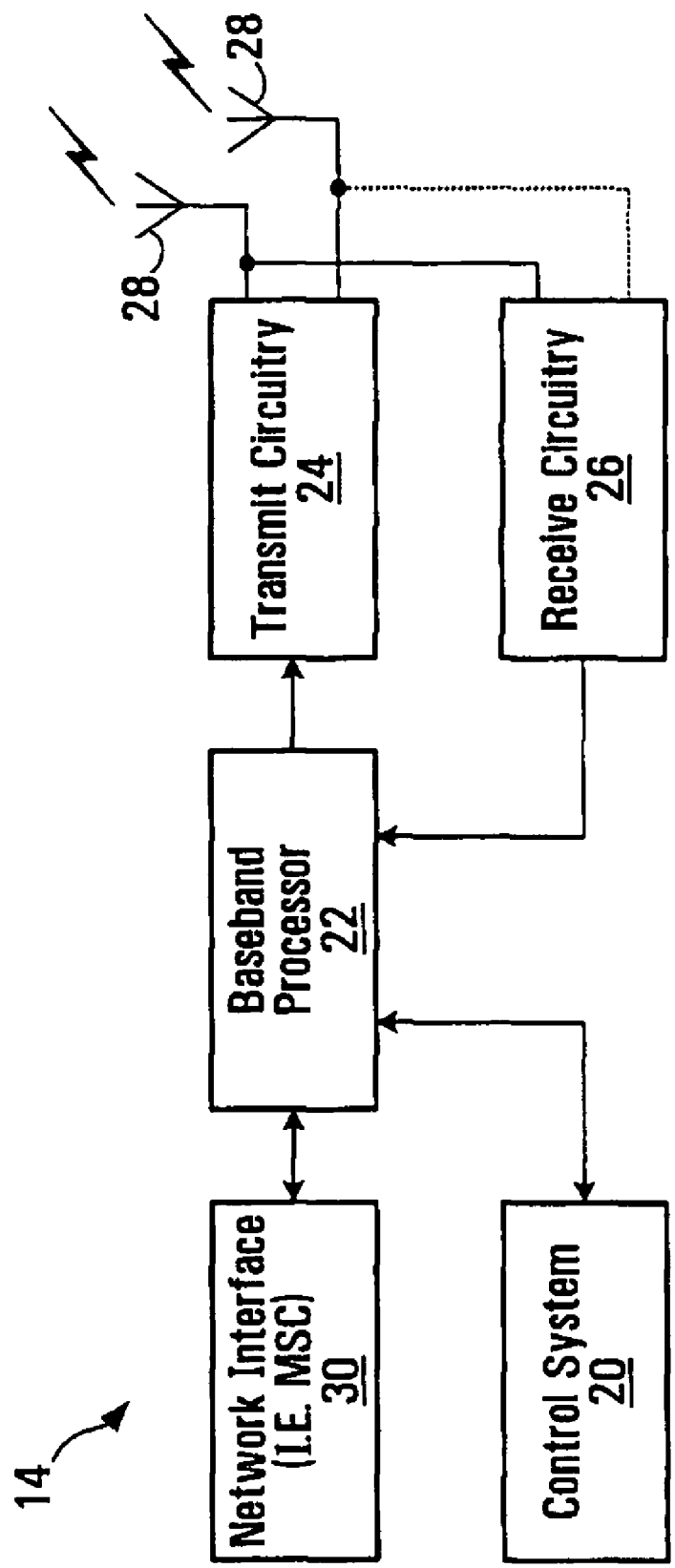
FIG. 19 is a block diagram of an example base station that might be used to implement some embodiments of the present invention.

A high level overview of the mobile terminals 16 and base stations 14 of the present invention is provided prior to delving into the structural and functional details of the embodiments. With reference to FIG. 19, a base station 14 configured according to one embodiment of the present invention is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 20).

In some embodiments, a low noise amplifier and a filter (not shown) cooperate to amplify and remove out-of-band interference from the signal for processing. Down conversion and digitization circuitry (not shown) will then down convert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). Modulation and processing details are described in greater detail below.

Figure 20:
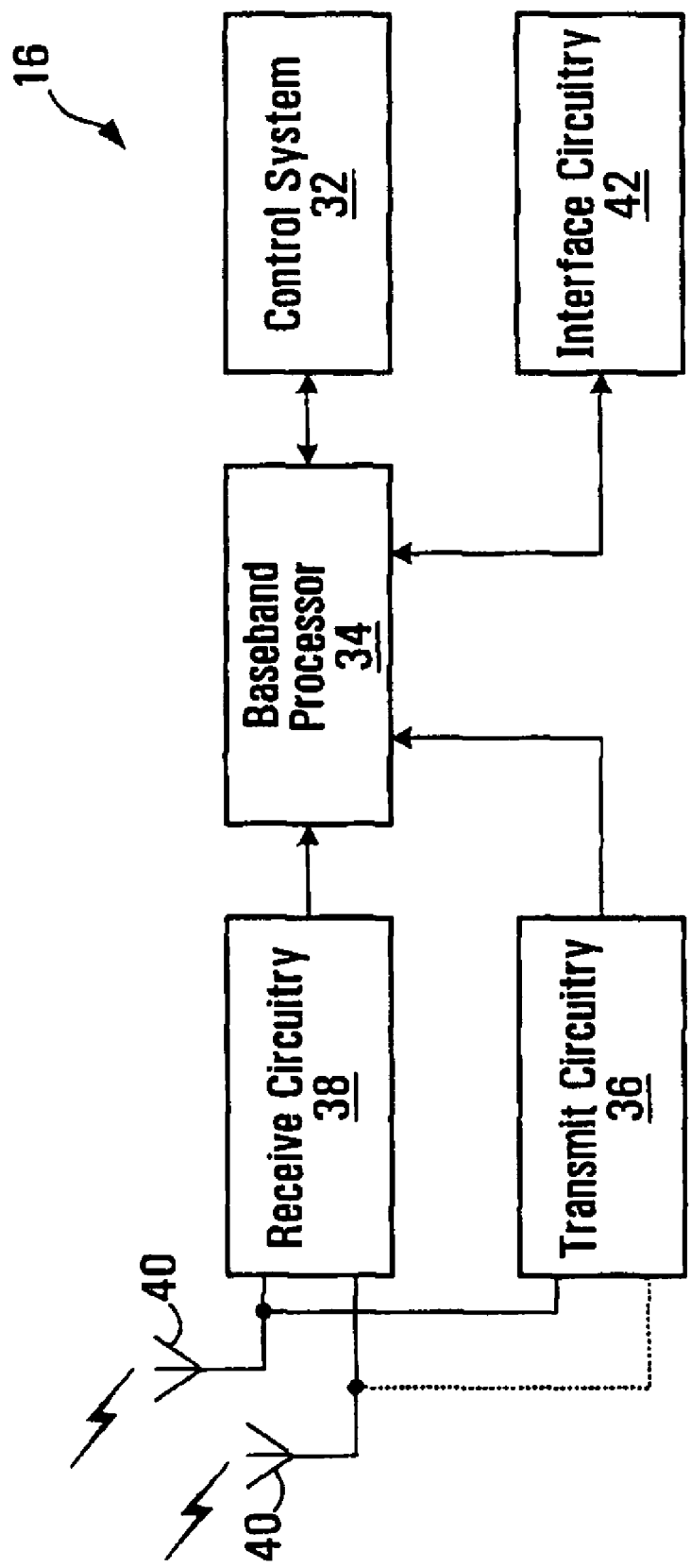
FIG. 20 is a block diagram of an example wireless terminal that might be used to implement some embodiments of the present invention.

With reference to FIG. 20, a mobile terminal 16 configured according to one embodiment of the present invention is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14.

In some embodiments, a low noise amplifier and a filter (not shown) cooperate to amplify and remove out-of-band interference from the signal for processing. Down conversion and digitization circuitry (not shown) will then down convert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations, as will be discussed in greater detail below. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are applicable to the present invention.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation requires the performance of an Inverse Fast Fourier Transform (IFFT) on the information to be transmitted. For demodulation, the performance of a Fast Fourier Transform (FFT) on the received signal may be used to recover the transmitted information. In practice, the IFFT and FFT may be provided by digital signal processing carrying out an Inverse Discrete Fourier Transform (IDFT) and Discrete Fourier Transform (DFT), respectively.

Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In some embodiments, OFDM is used for at least the downlink transmission from the base stations 14 to the mobile terminals 16. Each base station 14 is equipped with n transmit antennas 28, and each mobile terminal 16 is equipped with m receive antennas 40. Notably, the respective antennas can be used for reception and transmission using appropriate duplexers or switches and are so labeled only for clarity.

Figure 21:
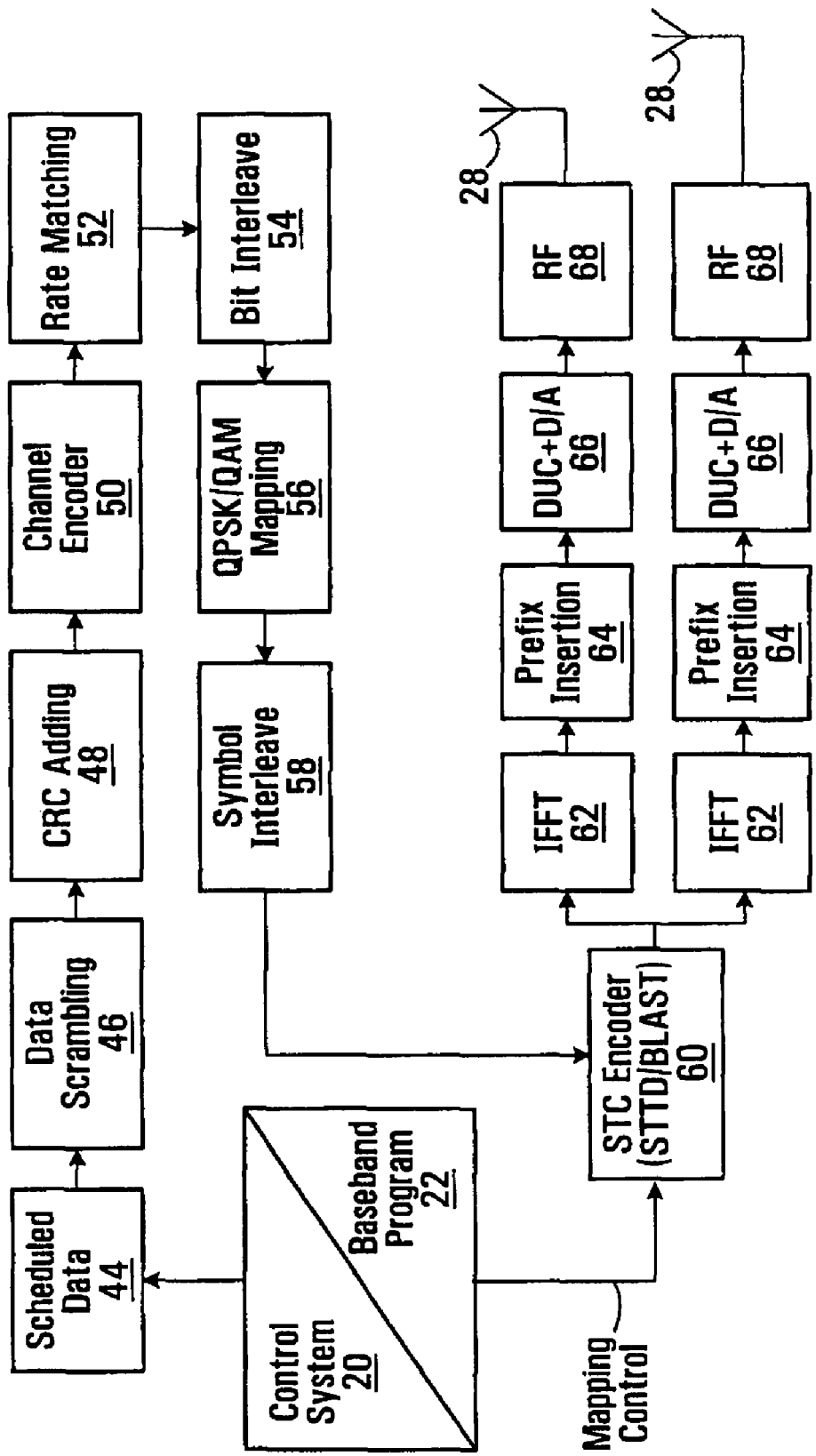
FIG. 21 is a block diagram of a logical breakdown of an example OFDM transmitter architecture that might be used to implement some embodiments of the present invention.

With reference to FIG. 21, a logical OFDM transmission architecture is provided according to one embodiment. Initially, the base station controller 10 will send data to be transmitted to various mobile terminals 16 to the base station 14. The base station 14 may use the CQIs associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

The scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. The channel encoder logic 50 uses known Turbo encoding techniques in one embodiment. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56.

In some embodiments, Quadrature Amplitude Modulation (QAM) or Quadrature Phase Shift Key (QPSK) modulation is used.

In some embodiments, the degree of modulation is chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide n outputs corresponding to the number of transmit antennas 28 for the base station 14. The control system 20 and/or baseband processor 22 will provide a mapping control signal to control STC encoding. At this point, assume the symbols for the n outputs are representative of the data to be transmitted and capable of being recovered by the mobile terminal 16. See A. F. Naguib, N. Seshadri, and A. R. Calderbank, "Applications of space-time codes and interference suppression for high capacity and high data rate wireless systems," Thirty-Second Asilomar Conference on Signals, Systems & Computers, Volume 2, pp. 1803-1810, 1998, which is incorporated herein by reference in its entirety.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein.

The IFFT processors 62 may operate on the respective symbols to provide an inverse Fourier Transform. The output of the IFFT processors 62 provides symbols in the time domain. The time domain symbols are grouped into frames, which are associated with a prefix by like insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 22:
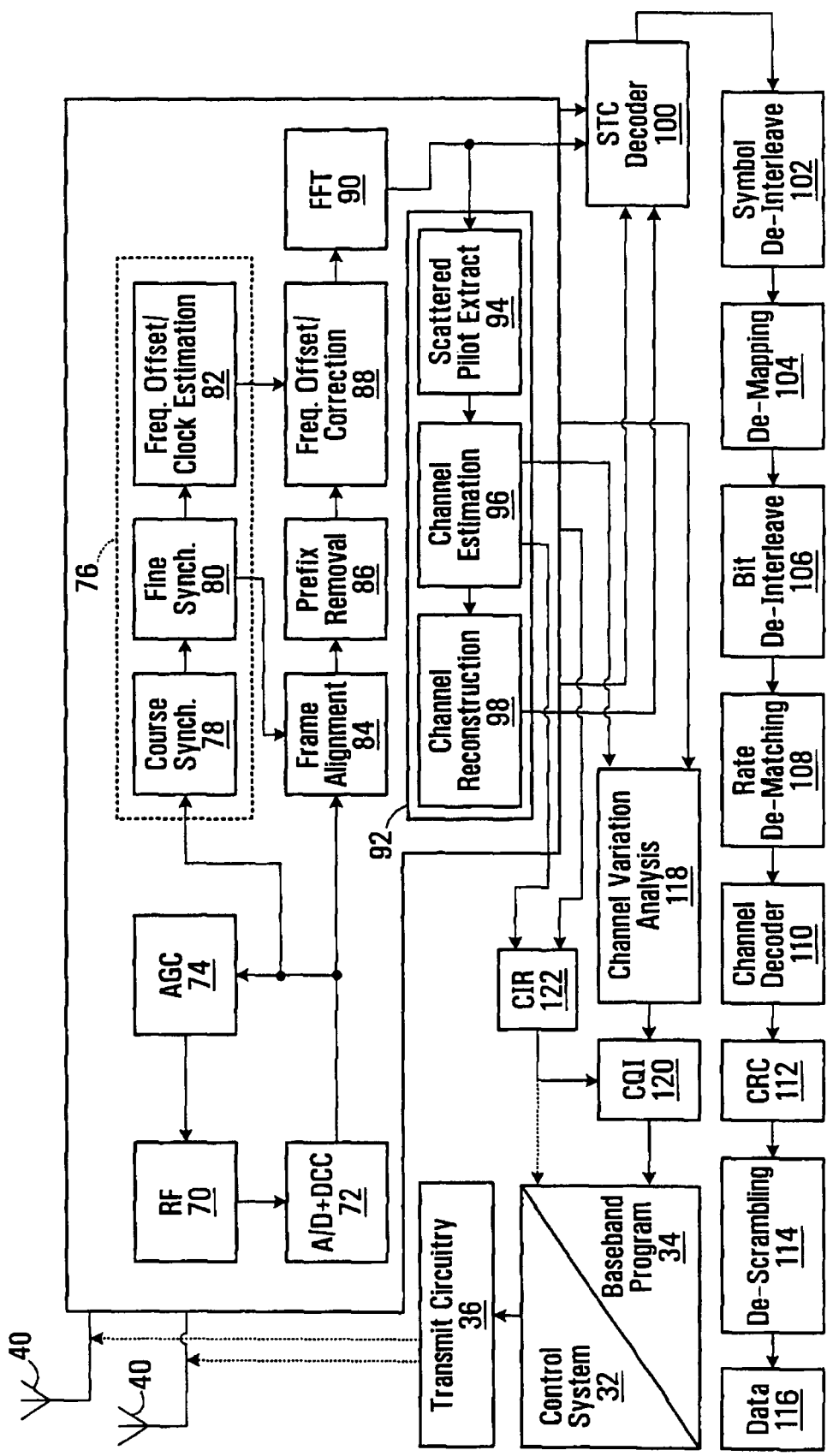
FIG. 22 is a block diagram of a logical breakdown of an example OFDM receiver architecture that might be used to implement some embodiments of the present invention.

Reference is now made to FIG. 22 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an autocorrelation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time to the frequency domain.

The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver.

In some embodiments, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency.

Figure 23:
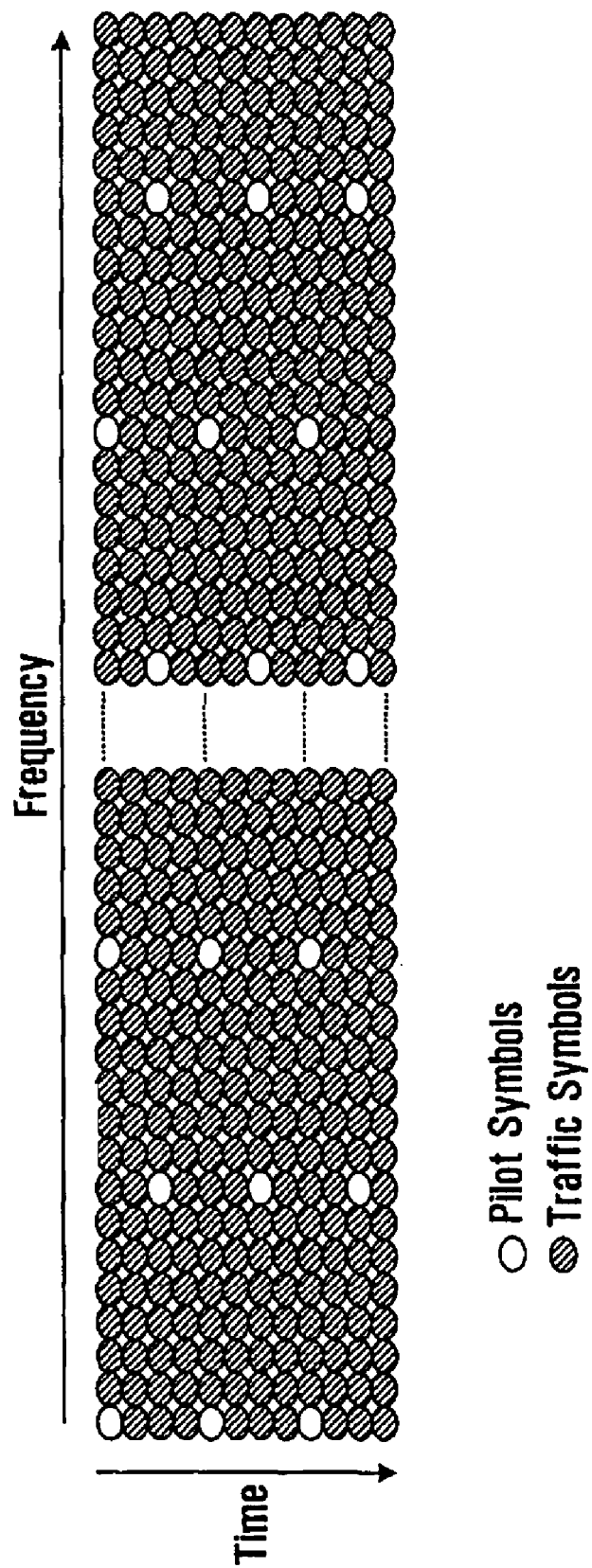
FIG. 23 depicts an exemplary scattering of pilot symbols among available sub-carriers.

FIG. 23 illustrates an exemplary scattering of pilot symbols among available sub-carriers over a given time and frequency plot in an OFDM environment. Continuing with FIG. 22, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

What has been described is merely illustrative of the application of the principles of the invention. Other arrangements and methods can be implemented by those skilled in the art without departing from the spirit and scope of the present invention.

The invention claimed is:

1. A method of adjusting a transceiver comprising:
for a boundary between adjacent spectrum blocks with differing operations:
a) adjusting at least one transition band of a filter in a transmitter of the transceiver; and
b) adjusting at least one transition band of a filter in a receiver of the transceiver,
wherein, for a), adjusting at least one transition band of the filter in the transmitter of the transceiver comprises:
in a first configuration, placing a transition band of the filter's at least one transition band on a first side of the boundary between the adjacent spectrum blocks; and
in a second configuration, placing the transition band on a second side of the boundary between the adjacent spectrum blocks,
wherein, for b), adjusting at least one transition band of the filter in the receiver of the transceiver comprises:
in the first configuration, placing a transition band of the filter's at least one transition band on the first side of the boundary between the adjacent spectrum blocks; and
in the second configuration, placing the transition band on the second side of the boundary between the adjacent spectrum blocks, and
wherein, for a) and b), placing the transition band is based on an active channel assignment for one or more of the adjacent spectrum blocks to accommodate utilization of edge channels in the adjacent spectrum blocks.

2. The method of claim 1, further comprising re-adjusting the transceiver as needed in event of a change in local conditions of use.

3. The method according to claim 2, wherein the change in local conditions of use comprises any one of a handover to a new network access point and a change of channel assignment.

4. The method according to claim 3, wherein the change of channel assignment is as a result of any one of load balancing, a change of service request and a change in channel usage by another transceiver in a shared-channel assignment.

5. The method according to claim 1, wherein:
a) adjusting at least one transition band of the filter in the transmitter of the transceiver; and
b) adjusting at least one transition band of the filter in the receiver of the transceiver,
are performed according to at least one of information received from a network, pre-programmed information and information stored from previous use.

6. The method according to claim 1, wherein adjusting at least one transition band comprises placing the transition band to separate channels in a shared-channel block according to a channel usage plan for a group comprising the transceiver and at least one other transceiver.

7. The method according to claim 1, wherein the spectrum block operating assignments are for the IMT-2000 bands.

8. The method according to claim 1, wherein the spectrum block operating assignments are for the IMT-2000 bands and the adjacent spectrum blocks comprise at least one of:
a Universal Mobile Telecommunications System (UMTS) Time Domain Duplex (TDD) block spanning 1900 MHz to 1920 MHz and a UMTS block spanning 1920 MHz to 1980 MHz;
the UMTS block spanning 1920 MHz to 1980 MHz and a Mobile Satellite Service (MSS) block spanning 1980 MHz to 2010 MHz;
the MSS block spanning 1980 MHz to 2010 MHz and a UMTS TDD block spanning 2010 MHz to 2025 MHz; and
a UMTS block spanning 2110 MHz to 2170 MHz and a MSS block spanning 2170 MHz to 2200 MHz.

9. The method according to claim 5, wherein the information stored from previous use comprises information about usage at locations and the transceiver is adjusted according to a location of the transceiver together with the stored information about previous usage at the location.

* * * * *